(12) United States Patent
Masputra et al.

(10) Patent No.: US 11,954,540 B2
(45) Date of Patent: Apr. 9, 2024

(54) METHODS AND APPARATUS FOR THREAD-LEVEL EXECUTION IN NON-KERNEL SPACE

(71) Applicant: Apple Inc., Cupertino, CA (US)

(72) Inventors: Cahya Adiansyah Masputra, San Jose, CA (US); Eric Tsz Leung Cheng, Cupertino, CA (US); Sandeep Nair, San Jose, CA (US); Wei Shen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 85 days.

(21) Appl. No.: 17/471,557

(22) Filed: Sep. 10, 2021

(65) Prior Publication Data

US 2022/0083388 A1 Mar. 17, 2022

Related U.S. Application Data

(60) Provisional application No. 63/078,247, filed on Sep. 14, 2020.

(51) Int. Cl.
*G06F 7/08* (2006.01)
*G06F 9/50* (2006.01)
(Continued)

(52) U.S. Cl.
CPC ............ *G06F 9/544* (2013.01); *G06F 9/5044* (2013.01); *G06F 9/545* (2013.01); *G06F 15/173* (2013.01);
(Continued)

(58) Field of Classification Search
CPC ........ G06F 9/544; G06F 9/5044; G06F 9/545; G06F 15/173; G06F 2209/548; G06F 15/1735; H04L 49/901; H04L 49/9047
See application file for complete search history.

(56) References Cited

U.S. PATENT DOCUMENTS 4,805,137 A 2/1989 Grant et al.
4,949,299 A 8/1990 Pickett
(Continued)

FOREIGN PATENT DOCUMENTS

EP 3013008 A1 4/2016
JP H02306082 A 12/1990
(Continued)

OTHER PUBLICATIONS

Moon-Sang Lee, Joonwon Lee and S. Maeng, "Context-aware address translation for high-performance SMP cluster system," 2008 IEEE International Conference on Cluster Computing, Tsukuba, 2008, pp. 292-297, doi: 10.1109/CLUSTR.2008.4663784. (Year: 2008).
(Continued)

*Primary Examiner* — Kevin L Young
*Assistant Examiner* — Abdou K Seye
(74) *Attorney, Agent, or Firm* — Sterne, Kessler, Goldstein & Fox P.L.L.C.

(57) ABSTRACT

Methods and apparatus for split memory allocations in non-kernel space. Many modern networking technologies use asymmetric transmit and/or receive resource. Various aspects described herein split memory resources for transmit and receive, configuring each for their respective hardware optimizations. For example, a receive data paths that support batch processing and packet aggregation may be allocated large memory objects (32 KB) that can route data packets on a per-flow basis. In contrast, transmit data paths that support multiple concurrent network connections may be allocated small memory objects (2 KB) that can route data packets one at a time.

20 Claims, 16 Drawing Sheets

(51) Int. Cl.
*G06F 9/54* (2006.01)
*G06F 15/173* (2006.01)
*H04L 49/901* (2022.01)
*H04L 49/9047* (2022.01)

(52) U.S. Cl.
CPC ...... *G06F 2209/548* (2013.01); *H04L 49/901* (2013.01); *H04L 49/9047* (2013.01)

(56) References Cited

U.S. PATENT DOCUMENTS

| | | | |
|---|---|---|---|
| 5,367,688 A | 11/1994 | Croll | |
| 5,467,459 A | 11/1995 | Alexander et al. | |
| 5,485,578 A | 1/1996 | Sweazey | |
| 5,506,968 A | 4/1996 | Dukes | |
| 5,613,086 A | 3/1997 | Frey et al. | |
| 5,659,542 A | 8/1997 | Bell et al. | |
| 5,708,779 A | 1/1998 | Graziano et al. | |
| 5,731,973 A | 3/1998 | Takaishi et al. | |
| 5,850,395 A | 12/1998 | Hauser et al. | |
| 5,903,564 A | 5/1999 | Ganmukhi et al. | |
| 5,943,507 A | 8/1999 | Cornish et al. | |
| 6,008,992 A | 12/1999 | Kawakami | |
| 6,032,179 A | 2/2000 | Osborne | |
| 6,216,178 B1 | 4/2001 | Stracovsky et al. | |
| 6,233,702 B1 | 5/2001 | Horst et al. | |
| 6,260,152 B1 | 7/2001 | Cole et al. | |
| 6,349,355 B1 | 2/2002 | Draves et al. | |
| 6,359,863 B1 | 3/2002 | Varma et al. | |
| 6,411,997 B1 | 6/2002 | Dawes et al. | |
| 6,485,081 B1 | 11/2002 | Bingle et al. | |
| 6,523,073 B1 | 2/2003 | Kammer et al. | |
| 6,553,446 B1 | 4/2003 | Miller | |
| 6,693,895 B1 | 2/2004 | Crummey et al. | |
| 6,815,873 B2 | 11/2004 | Johnson et al. | |
| 6,874,075 B2 | 3/2005 | Jerding et al. | |
| 6,948,094 B2 | 9/2005 | Schultz et al. | |
| 6,973,701 B2 | 12/2005 | Momoda et al. | |
| 6,990,594 B2 | 1/2006 | Kim | |
| 7,013,536 B2 | 3/2006 | Golden et al. | |
| 7,032,282 B2 | 4/2006 | Powell et al. | |
| 7,100,020 B1 | 8/2006 | Brightman et al. | |
| 7,111,307 B1 | 9/2006 | Wang | |
| 7,127,600 B2 | 10/2006 | Zimmer et al. | |
| 7,152,231 B1 | 12/2006 | Galluscio et al. | |
| 7,281,172 B2 | 10/2007 | Chujo | |
| 7,397,774 B1 | 7/2008 | Holland et al. | |
| 7,398,382 B2 | 7/2008 | Rothman et al. | |
| 7,403,542 B1 | 7/2008 | Thompson | |
| 7,506,084 B2 | 3/2009 | Moerti et al. | |
| 7,509,391 B1 | 3/2009 | Chauvel et al. | |
| 7,587,575 B2 | 9/2009 | Moertl et al. | |
| 7,590,817 B2 | 9/2009 | Moertl et al. | |
| 7,617,377 B2 | 11/2009 | Moertl et al. | |
| 7,681,012 B2 | 3/2010 | Verma et al. | |
| 7,685,476 B2 | 3/2010 | Andre et al. | |
| 7,802,256 B2 | 9/2010 | Havens | |
| 7,853,731 B1 | 12/2010 | Zeng | |
| 7,899,941 B2 | 3/2011 | Hendry et al. | |
| 7,941,682 B2 | 5/2011 | Adams | |
| 8,214,707 B2 | 7/2012 | Munson et al. | |
| 8,230,248 B2 | 7/2012 | Dance et al. | |
| 8,239,947 B1 | 8/2012 | Glick et al. | |
| 8,255,725 B2 | 8/2012 | Shimazaki et al. | |
| 8,271,996 B1 | 9/2012 | Gould et al. | |
| 8,352,624 B2 | 1/2013 | Zimmerman et al. | |
| 8,468,285 B2 | 6/2013 | Kobayashi | |
| 8,555,099 B2 | 10/2013 | Marinkovic et al. | |
| 8,561,090 B2 | 10/2013 | Schneider | |
| 8,635,412 B1 | 1/2014 | Wilshire | |
| 8,656,228 B2 | 2/2014 | Check et al. | |
| 8,769,168 B2 | 7/2014 | Moertl et al. | |
| 8,788,822 B1 | 7/2014 | Riddle | |
| 8,799,537 B1 | 8/2014 | Zhu et al. | |
| 8,806,640 B2 | 8/2014 | Wang | |
| 8,819,386 B1 | 8/2014 | Mather | |
| 8,848,809 B2 | 9/2014 | Whitby-Strevens | |
| 8,855,120 B2 | 10/2014 | Robbins | |
| 8,876,062 B1 | 11/2014 | Baghdasarian | |
| 9,049,179 B2 | 6/2015 | Luna | |
| 9,130,864 B2 | 9/2015 | Keith | |
| 9,135,059 B2 | 9/2015 | Ballard et al. | |
| 9,152,580 B1 | 10/2015 | Chau et al. | |
| 9,170,957 B2 | 10/2015 | Touzni et al. | |
| 9,280,360 B2 | 3/2016 | Xu et al. | |
| 9,319,090 B2 | 4/2016 | Whitby-Strevens | |
| 9,483,305 B1 | 11/2016 | Shmidt et al. | |
| 9,544,069 B2 | 1/2017 | Whitby-Strevens et al. | |
| 9,547,535 B1 | 1/2017 | Wilt | |
| 9,594,718 B2 | 3/2017 | Kaushik et al. | |
| 9,769,756 B1 | 9/2017 | Cui et al. | |
| 9,830,289 B2 | 11/2017 | Pulyala et al. | |
| 9,910,475 B2 | 3/2018 | Kurts et al. | |
| 9,913,305 B2 | 3/2018 | Pinheiro et al. | |
| 9,932,757 B2 | 4/2018 | Hager | |
| 9,959,124 B1 | 5/2018 | Herbeck et al. | |
| 9,985,904 B2 | 5/2018 | Shalev et al. | |
| 10,078,361 B2 | 9/2018 | Sanghi et al. | |
| 10,230,608 B2 | 3/2019 | Tsirkin | |
| 10,289,555 B1 | 5/2019 | Michaud et al. | |
| 10,331,600 B1 | 6/2019 | Rajadnya et al. | |
| 10,331,612 B1 | 6/2019 | Petkov et al. | |
| 10,534,601 B1 | 1/2020 | Venkata et al. | |
| 10,552,072 B1 | 2/2020 | Bono et al. | |
| 10,678,432 B1 | 6/2020 | Dreier et al. | |
| 10,798,059 B1 | 10/2020 | Singh et al. | |
| 10,798,224 B2 | 10/2020 | Masputra et al. | |
| 10,819,831 B2 | 10/2020 | Masputra et al. | |
| 10,877,823 B1 * | 12/2020 | Lawrence | G06F 9/544 |
| 10,999,132 B1 | 5/2021 | Sagar et al. | |
| 11,095,758 B2 | 8/2021 | Masputra et al. | |
| 11,146,665 B2 | 10/2021 | Masputra et al. | |
| 11,159,651 B2 | 10/2021 | Masputra et al. | |
| 11,178,259 B2 | 11/2021 | Masputra et al. | |
| 11,178,260 B2 | 11/2021 | Masputra et al. | |
| 11,212,373 B2 | 12/2021 | Masputra et al. | |
| 11,368,560 B2 | 6/2022 | Masputra et al. | |
| 11,477,123 B2 | 10/2022 | Masputra et al. | |
| 11,558,348 B2 | 1/2023 | Masputra et al. | |
| 2001/0037410 A1 | 11/2001 | Gardner | |
| 2002/0013868 A1 | 1/2002 | West | |
| 2002/0044553 A1 | 4/2002 | Chakravorty | |
| 2002/0053011 A1 | 5/2002 | Aiken et al. | |
| 2002/0065867 A1 | 5/2002 | Chauvel | |
| 2002/0169938 A1 | 11/2002 | Scott et al. | |
| 2002/0195177 A1 | 12/2002 | Hinkley et al. | |
| 2003/0014607 A1 | 1/2003 | Slavin et al. | |
| 2003/0061395 A1 | 3/2003 | Kingsbury et al. | |
| 2003/0120935 A1 | 6/2003 | Teal et al. | |
| 2003/0200413 A1 | 10/2003 | Gurumoorthy et al. | |
| 2004/0010473 A1 | 1/2004 | Hsu et al. | |
| 2004/0010545 A1 | 1/2004 | Pandya | |
| 2004/0044929 A1 | 3/2004 | Chujo | |
| 2004/0105384 A1 | 6/2004 | Gallezot et al. | |
| 2004/0128568 A1 | 7/2004 | O'Shea | |
| 2004/0179546 A1 | 9/2004 | McDaniel et al. | |
| 2004/0201749 A1 | 10/2004 | Malloy Desormeaux | |
| 2004/0221056 A1 | 11/2004 | Kobayashi | |
| 2004/0228365 A1 | 11/2004 | Kobayashi | |
| 2004/0249957 A1 | 12/2004 | Ekis et al. | |
| 2005/0055406 A1 | 3/2005 | Singhai et al. | |
| 2005/0068897 A1 | 3/2005 | Arita et al. | |
| 2005/0076196 A1 | 4/2005 | Zimmer et al. | |
| 2005/0076244 A1 | 4/2005 | Watanabe | |
| 2005/0108385 A1 | 5/2005 | Wechter et al. | |
| 2005/0114620 A1 | 5/2005 | Justen | |
| 2005/0117601 A1 | 6/2005 | Anderson et al. | |
| 2005/0138628 A1 | 6/2005 | Bradford et al. | |
| 2005/0140683 A1 | 6/2005 | Collins et al. | |
| 2005/0149711 A1 | 7/2005 | Zimmer et al. | |
| 2005/0157781 A1 | 7/2005 | Ho et al. | |
| 2005/0198777 A1 | 9/2005 | Mabe | |
| 2005/0278498 A1 | 12/2005 | Ahluwalia et al. | |
| 2005/0285862 A1 | 12/2005 | Noda et al. | |

(56) References Cited

U.S. PATENT DOCUMENTS

| | | |
|---|---|---|
| 2006/0039285 A1 | 2/2006 | Chapman et al. |
| 2006/0047989 A1 | 3/2006 | Delgado et al. |
| 2006/0075119 A1 | 4/2006 | Hussain et al. |
| 2006/0107071 A1 | 5/2006 | Girish et al. |
| 2006/0136570 A1 | 6/2006 | Pandya |
| 2006/0186700 A1 | 8/2006 | Browne et al. |
| 2006/0186706 A1 | 8/2006 | Browne et al. |
| 2006/0215697 A1 | 9/2006 | Olderdissen |
| 2006/0218301 A1 | 9/2006 | O'Toole et al. |
| 2006/0232051 A1 | 10/2006 | Morris et al. |
| 2006/0248542 A1 | 11/2006 | Wang et al. |
| 2007/0005869 A1 | 1/2007 | Balraj et al. |
| 2007/0008983 A1 | 1/2007 | Van Doren et al. |
| 2007/0043901 A1 | 2/2007 | Wu et al. |
| 2007/0063540 A1 | 3/2007 | Browne et al. |
| 2007/0063541 A1 | 3/2007 | Browne et al. |
| 2007/0070997 A1 | 3/2007 | Weitz et al. |
| 2007/0080013 A1 | 4/2007 | Melz et al. |
| 2007/0086480 A1 | 4/2007 | Elzur |
| 2007/0118831 A1 | 5/2007 | Kondo |
| 2007/0180041 A1 | 8/2007 | Suzuoki |
| 2007/0183418 A1 | 8/2007 | Riddoch et al. |
| 2007/0201492 A1 | 8/2007 | Kobayashi |
| 2007/0226375 A1 | 9/2007 | Chu et al. |
| 2007/0226417 A1 | 9/2007 | Davis |
| 2007/0255802 A1 | 11/2007 | Aloni et al. |
| 2007/0255866 A1 | 11/2007 | Aloni et al. |
| 2007/0261307 A1 | 11/2007 | Alexander |
| 2007/0286246 A1 | 12/2007 | Kobayashi |
| 2008/0005794 A1 | 1/2008 | Inoue et al. |
| 2008/0007081 A1 | 1/2008 | Shibata et al. |
| 2008/0010563 A1 | 1/2008 | Nishimura |
| 2008/0046689 A1 | 2/2008 | Chen et al. |
| 2008/0077816 A1 | 3/2008 | Ravichandran |
| 2008/0100079 A1 | 5/2008 | Herrera et al. |
| 2008/0100092 A1 | 5/2008 | Gao et al. |
| 2008/0120911 A1 | 5/2008 | Browne et al. |
| 2008/0127292 A1 | 5/2008 | Cooper et al. |
| 2008/0148291 A1 | 6/2008 | Huang et al. |
| 2008/0183931 A1 | 7/2008 | Verm et al. |
| 2008/0231711 A1 | 9/2008 | Glen et al. |
| 2008/0235355 A1 | 9/2008 | Spanier et al. |
| 2008/0244259 A1 | 10/2008 | Zimmer et al. |
| 2008/0301148 A1 | 12/2008 | Lee et al. |
| 2009/0006920 A1 | 1/2009 | Munson et al. |
| 2009/0024924 A1 | 1/2009 | Kim |
| 2009/0064177 A1* | 3/2009 | Bauer ................ H04L 49/9063 719/313 |
| 2009/0092057 A1 | 4/2009 | Doctor et al. |
| 2009/0113141 A1 | 4/2009 | Bullman et al. |
| 2009/0138650 A1 | 5/2009 | Lin et al. |
| 2009/0172674 A1 | 7/2009 | Bobak et al. |
| 2009/0177847 A1 | 7/2009 | Ceze et al. |
| 2009/0189442 A1 | 7/2009 | Chi |
| 2009/0225818 A1 | 9/2009 | Dapper et al. |
| 2009/0240874 A1 | 9/2009 | Pong |
| 2009/0265723 A1 | 10/2009 | Mochizuki et al. |
| 2009/0322531 A1 | 12/2009 | Estevez et al. |
| 2010/0005014 A1 | 1/2010 | Castle et al. |
| 2010/0017655 A1 | 1/2010 | Gooding et al. |
| 2010/0049876 A1 | 2/2010 | Pope et al. |
| 2010/0057932 A1 | 3/2010 | Pope et al. |
| 2010/0082859 A1 | 4/2010 | Hendry et al. |
| 2010/0098419 A1 | 4/2010 | Levy et al. |
| 2010/0118041 A1 | 5/2010 | Chen et al. |
| 2010/0329319 A1 | 12/2010 | Dai et al. |
| 2011/0029696 A1 | 2/2011 | Uehara |
| 2011/0035575 A1 | 2/2011 | Kwon |
| 2011/0052142 A1 | 3/2011 | Sultenfuss et al. |
| 2011/0083002 A1 | 4/2011 | Albers et al. |
| 2011/0161619 A1 | 6/2011 | Kaminski et al. |
| 2011/0219208 A1 | 9/2011 | Asaad et al. |
| 2011/0242425 A1 | 10/2011 | Zeng |
| 2011/0246742 A1 | 10/2011 | Kogen et al. |
| 2011/0276710 A1 | 11/2011 | Mighani et al. |
| 2011/0292936 A1 | 12/2011 | Wang et al. |
| 2011/0310296 A1 | 12/2011 | Lee et al. |
| 2011/0320861 A1 | 12/2011 | Bayer et al. |
| 2012/0017063 A1 | 1/2012 | Hummel et al. |
| 2012/0036334 A1 | 2/2012 | Horman et al. |
| 2012/0072658 A1 | 3/2012 | Hashimoto |
| 2012/0084483 A1 | 4/2012 | Sanjive |
| 2012/0084484 A1 | 4/2012 | Post et al. |
| 2012/0102307 A1 | 4/2012 | Wong |
| 2012/0124252 A1 | 5/2012 | Kayama |
| 2012/0151472 A1* | 6/2012 | Koch .................. G06F 9/45558 718/1 |
| 2012/0203880 A1 | 8/2012 | Kluyt et al. |
| 2012/0224640 A1 | 9/2012 | Sole Rojals et al. |
| 2012/0229076 A1 | 9/2012 | Zhu et al. |
| 2012/0260017 A1 | 10/2012 | Mine et al. |
| 2013/0039278 A1 | 2/2013 | Bouazizi et al. |
| 2013/0050216 A1 | 2/2013 | Whitby-Strevens et al. |
| 2013/0057567 A1 | 3/2013 | Frank et al. |
| 2013/0067188 A1 | 3/2013 | Mehra et al. |
| 2013/0091772 A1 | 4/2013 | Berger et al. |
| 2013/0111014 A1 | 5/2013 | Lawrie et al. |
| 2013/0138840 A1 | 5/2013 | Kegel et al. |
| 2013/0162911 A1 | 6/2013 | Glen |
| 2013/0204927 A1 | 8/2013 | Kruglikov et al. |
| 2013/0205113 A1 | 8/2013 | Ahmad et al. |
| 2013/0275976 A1 | 10/2013 | Dawson et al. |
| 2013/0290947 A1 | 10/2013 | Li |
| 2013/0347131 A1 | 12/2013 | Mooring et al. |
| 2014/0033220 A1 | 1/2014 | Campbell et al. |
| 2014/0068624 A1 | 3/2014 | Fuller et al. |
| 2014/0068636 A1 | 3/2014 | Dupont et al. |
| 2014/0122695 A1 | 5/2014 | Kulikov et al. |
| 2014/0122828 A1 | 5/2014 | Kagan et al. |
| 2014/0173236 A1 | 6/2014 | Kegel |
| 2014/0189057 A1 | 7/2014 | Sankoda et al. |
| 2014/0211894 A1 | 7/2014 | Yang |
| 2014/0247983 A1 | 9/2014 | MacInnis et al. |
| 2014/0355606 A1 | 12/2014 | Riddoch et al. |
| 2015/0007262 A1 | 1/2015 | Aissi et al. |
| 2015/0036051 A1 | 2/2015 | Broberg et al. |
| 2015/0058444 A1 | 2/2015 | Willmann |
| 2015/0081985 A1 | 3/2015 | Archer et al. |
| 2015/0156122 A1 | 6/2015 | Singh et al. |
| 2015/0172345 A1 | 6/2015 | Mantin et al. |
| 2015/0189109 A1 | 7/2015 | Whitby-Strevens et al. |
| 2015/0205749 A1 | 7/2015 | Whitby-Strevens et al. |
| 2015/0212806 A1 | 7/2015 | Hsieh |
| 2015/0244804 A1 | 8/2015 | Warfield et al. |
| 2015/0261588 A1 | 9/2015 | Liu et al. |
| 2015/0309940 A1 | 10/2015 | Kumar |
| 2015/0326542 A1 | 11/2015 | Serebrin |
| 2015/0363110 A1 | 12/2015 | Batra et al. |
| 2015/0370582 A1 | 12/2015 | Kinsella et al. |
| 2015/0378737 A1 | 12/2015 | Debbage et al. |
| 2016/0028635 A1 | 1/2016 | Wang |
| 2016/0034195 A1 | 2/2016 | Li et al. |
| 2016/0041852 A1 | 2/2016 | Suarez Gracia et al. |
| 2016/0044143 A1 | 2/2016 | Narasimhamurthy |
| 2016/0063258 A1 | 3/2016 | Ackerly |
| 2016/0077989 A1 | 3/2016 | Pulyala et al. |
| 2016/0103480 A1 | 4/2016 | Sanghi et al. |
| 2016/0103689 A1 | 4/2016 | Sanghi et al. |
| 2016/0103743 A1 | 4/2016 | Sanghi et al. |
| 2016/0142988 A1 | 5/2016 | Powell et al. |
| 2016/0208539 A1 | 7/2016 | Hofmann et al. |
| 2016/0224442 A1 | 8/2016 | Sanghi et al. |
| 2016/0226957 A1 | 8/2016 | Zhang et al. |
| 2016/0226967 A1 | 8/2016 | Zhang et al. |
| 2016/0231929 A1 | 8/2016 | Tsirkin |
| 2016/0261632 A1 | 9/2016 | Kölhi et al. |
| 2016/0269991 A1 | 9/2016 | Van Greunen et al. |
| 2016/0357443 A1 | 12/2016 | Li et al. |
| 2016/0363955 A1 | 12/2016 | Stevens et al. |
| 2016/0364350 A1 | 12/2016 | Sanghi et al. |
| 2016/0378545 A1 | 12/2016 | Ho |
| 2017/0003977 A1 | 1/2017 | Sumida et al. |
| 2017/0003997 A1 | 1/2017 | Kelly et al. |
| 2017/0075856 A1 | 3/2017 | Suzue et al. |

(56) References Cited

U.S. PATENT DOCUMENTS

| | | |
|---|---|---|
| 2017/0089641 A1 | 3/2017 | Humfeld et al. |
| 2017/0108912 A1 | 4/2017 | Li et al. |
| 2017/0111283 A1 | 4/2017 | Kumar et al. |
| 2017/0124327 A1 | 5/2017 | Kumbhar et al. |
| 2017/0126726 A1 | 5/2017 | Han |
| 2017/0147282 A1 | 5/2017 | Seo |
| 2017/0149890 A1 | 5/2017 | Shamis et al. |
| 2017/0187621 A1 | 6/2017 | Shalev et al. |
| 2017/0187846 A1 | 6/2017 | Shalev et al. |
| 2017/0249098 A1 | 8/2017 | Petkov et al. |
| 2017/0264497 A1 | 9/2017 | Lim |
| 2017/0286300 A1 | 10/2017 | Doshi et al. |
| 2017/0286322 A1 | 10/2017 | Garg et al. |
| 2017/0286323 A1 | 10/2017 | Garg et al. |
| 2017/0308460 A1 | 10/2017 | Guthula et al. |
| 2017/0337588 A1 | 11/2017 | Chittilappilly et al. |
| 2017/0353499 A1 | 12/2017 | Huang et al. |
| 2017/0371591 A1 | 12/2017 | Xia et al. |
| 2018/0004690 A1 | 1/2018 | Kaminski et al. |
| 2018/0070341 A1 | 3/2018 | Islam et al. |
| 2018/0081829 A1 | 3/2018 | Kaplan |
| 2018/0129261 A1 | 5/2018 | Garg et al. |
| 2018/0129269 A1 | 5/2018 | Garg et al. |
| 2018/0129270 A1 | 5/2018 | Garg et al. |
| 2018/0173643 A1 | 6/2018 | Yu et al. |
| 2018/0196648 A1 | 7/2018 | Henderson et al. |
| 2018/0219805 A1 | 8/2018 | MacNeil et al. |
| 2018/0219976 A1 | 8/2018 | Decenzo et al. |
| 2018/0239657 A1 | 8/2018 | Petrbok et al. |
| 2018/0248847 A1 | 8/2018 | Guri et al. |
| 2018/0253315 A1 | 9/2018 | Norton et al. |
| 2018/0285561 A1 | 10/2018 | Frank et al. |
| 2018/0295052 A1 | 10/2018 | Laurent |
| 2018/0329743 A1 | 11/2018 | Pope et al. |
| 2018/0343206 A1 | 11/2018 | White et al. |
| 2018/0357176 A1 | 12/2018 | Wang |
| 2019/0007850 A1 | 1/2019 | DenBoer et al. |
| 2019/0036893 A1 | 1/2019 | Jiang |
| 2019/0052659 A1 | 2/2019 | Weingarten et al. |
| 2019/0065301 A1 | 2/2019 | Tsirkin et al. |
| 2019/0097938 A1 | 3/2019 | Talla et al. |
| 2019/0102303 A1 | 4/2019 | Wang et al. |
| 2019/0102568 A1 | 4/2019 | Hausauer et al. |
| 2019/0109714 A1 | 4/2019 | Clark et al. |
| 2019/0140983 A1 | 5/2019 | Tu et al. |
| 2019/0141041 A1 | 5/2019 | Bhabbur et al. |
| 2019/0147066 A1 | 5/2019 | Ben Dayan et al. |
| 2019/0147069 A1 | 5/2019 | Ben Dayan et al. |
| 2019/0205533 A1 | 7/2019 | Diehl et al. |
| 2019/0213044 A1 | 7/2019 | Cui et al. |
| 2019/0213166 A1 | 7/2019 | Petkov et al. |
| 2019/0253351 A1 | 8/2019 | Ihlar et al. |
| 2019/0286466 A1 | 9/2019 | Tsirkin et al. |
| 2019/0303204 A1 | 10/2019 | Masputra et al. |
| 2019/0303205 A1 | 10/2019 | Masputra et al. |
| 2019/0303221 A1 | 10/2019 | Masputra et al. |
| 2019/0303222 A1 | 10/2019 | Masputra et al. |
| 2019/0303280 A1 | 10/2019 | Masputra et al. |
| 2019/0303562 A1 | 10/2019 | Masputra et al. |
| 2019/0303576 A1* | 10/2019 | Masputra ............ G06F 21/6281 |
| 2019/0306076 A1 | 10/2019 | Masputra et al. |
| 2019/0306087 A1 | 10/2019 | Masputra et al. |
| 2019/0306109 A1 | 10/2019 | Masputra et al. |
| 2019/0306281 A1 | 10/2019 | Masputra et al. |
| 2019/0306282 A1 | 10/2019 | Masputra et al. |
| 2020/0019695 A1 | 1/2020 | Sovio et al. |
| 2020/0036615 A1 | 1/2020 | Lewis |
| 2020/0045015 A1 | 2/2020 | Nukala et al. |
| 2020/0065244 A1 | 2/2020 | Sanghi et al. |
| 2020/0073829 A1 | 3/2020 | Tsirkin et al. |
| 2020/0195684 A1 | 6/2020 | Linz |
| 2021/0011856 A1 | 1/2021 | Xia et al. |
| 2021/0097006 A1 | 4/2021 | Masputra et al. |
| 2021/0099391 A1 | 4/2021 | Masputra et al. |
| 2021/0099427 A1 | 4/2021 | Masputra et al. |
| 2021/0303375 A1* | 9/2021 | Stevens .................. G06F 9/544 |
| 2022/0030095 A1 | 1/2022 | Masputra et al. |
| 2022/0046117 A1 | 2/2022 | Masputra et al. |
| 2023/0155980 A1 | 5/2023 | Masputra et al. |

FOREIGN PATENT DOCUMENTS

| | | |
|---|---|---|
| JP | H03169996 A | 7/1991 |
| JP | 2004086792 A | 3/2004 |
| JP | 2012108677 A | 6/2012 |
| JP | 2013246642 A | 12/2013 |
| JP | 2015001867 A | 1/2015 |
| WO | WO 2008070138 A2 | 6/2008 |

OTHER PUBLICATIONS

Honda et al., "Rekindling Network Protocol Innovation with User-Level Stacks", ACM SIGCOMM Computer Communication Review, vol. 44, No. 2, Apr. 2014.

Gopalakrishnan R., et al., "Efficient User-Space Protocol Implementations with QoS Guarantees Using Real-Time Upcalls", IEEE/ACM Transactions on Networking, Aug. 1998, vol. 6 (4), pp. 374-388.

ECN L1 PM Substates with CLKREQ approved Aug. 23, 2012.

Jackson, "PCI Express Technology", Sep. 2012 (Sep. 2012), MindShare Press, xP002777351, pp. 49,86,87,712-723.

PCI Express base Specification Revision 3.0, published Nov. 10, 2010.

PCI Express Base Specification Revision 3.1, published Oct. 8, 2014.

Universal Serial Bus, Communication Class, Subclass Specifications for Network Control Model (NCM) Devices; Revision 1.0 (Errata 1), Nov. 24, 2010, published by USB Implementers Forum, Inc.

Whitworth, "Improving Networking by moving the network stack to userspace", Imperial College London, Jun. 14, 2010 [Mar. 17, 2022]; retrieved from the Internet: <URL https://www.doc.ic.ac.uk/teaching/distinguished-projects/2010/m.whitworth.pdf> (Year: 2010).

* cited by examiner

METHODS AND APPARATUS FOR THREAD-LEVEL EXECUTION IN NON-KERNEL SPACE

CROSS-REFERENCE TO RELATED APPLICATIONS

The present application claims the benefit of United States Provisional Patent Application No. 63/078,247, filed Sep. 14, 2020, which is incorporated herein by reference in its entirety.

The present application incorporates by reference the following U.S. patent application Ser. No. 16/144,992, filed Sep. 27, 2018, U.S. patent application Ser. No. 16/146,533, filed Sep. 28, 2018, now U.S. Pat. No. 11,178,259, U.S. patent application Ser. No. 16/146,324, filed Sep. 28, 2018, now U.S. Pat. No. 10,798,224, U.S. patent application Ser. No. 16/146,916, filed Sep. 28, 2018, now U.S. Pat. No. 10,819,831, U.S. patent application Ser. No. 16/236,032, filed Dec. 28, 2018, now U.S. Pat. No. 11,212,373, U.S. patent application Ser. No. 16/363,495, filed Mar. 25, 2019, now U.S. Pat. No. 11,178,260, U.S. patent application Ser. No. 16/368,396, filed on Mar. 26, 2019, U.S. patent application Ser. No. 16/368,338, filed on Mar. 28, 2019, now U.S. Pat. No. 11,159,651, U.S. patent application Ser. No. 16/365,484, filed on Mar. 26, 2019, now U.S. Pat. No. 11,095,758, U.S. patent application Ser. No. 16/368,368, filed on Mar. 28, 2019, U.S. patent application Ser. No. 16/368,214, filed on Mar. 28, 2019, now U.S. Pat. No. 11,368,560, U.S. patent application Ser. No. 16/936,228, filed Jul. 22, 2020, now U.S. Pat. No. 11,477,123, U.S. patent application Ser. No. 16/935,982, filed Jul. 22, 2020, now U.S. Pat. No. 11,558,348, and U.S. patent application Ser. No. 16/936,143, filed Jul. 22, 2020, all in their entirety.

BACKGROUND

Field of Disclosure

The disclosure relates generally to the field of electronic devices, as well as networks thereof and including computerized networking stack infrastructures.

Related Art

The consumer electronics industry has seen explosive growth in network connectivity. As an example, Internet connectivity is virtually ubiquitous across many different device types for a variety of different applications and functionalities. The successful implementation of network connectivity over a myriad of different usage cases has been enabled by the principles of modular design and abstraction. Specifically, the conventional network communication paradigm incorporates multiple modular software "layers" into a "communication stack." Each layer of the communication stack separately manages its own implementation specific considerations and provides an "abstracted" communication interface to the next layer. In this manner, different applications can communicate freely across different devices without considering the underlying network transport.

For a variety of reasons, network communication stacks have historically been executed as kernel space processes. Kernel space processes are executed at the highest priority and privilege levels. This treatment was necessary to, for example, efficiently use scarce network resources. Over time, networking connectivity has commoditized, and device expectations have become more aggressive. As a result, most network communications are low priority relative to other device tasks.

Incipient consumer devices, such as, the iPhone®, MacBook®, iPad®, etc. to provide some examples have modified their network communication stack to execute as non-kernel space processes. Non-kernel tasks can be executed according to various prioritizations and/or privileges. Within this context, new solutions for thread-level execution in non-kernel space are needed.

SUMMARY

Some embodiments of this disclosure describe a computer system. The computer system includes a shared memory having a submission queue and a completion queue, a shared packet pool, a network interface within a kernel space, and a device driver within a non-kernel space. The network interface can write a data packet into the shared packet pool and queue a pointer into the submission queue that indicates a location of the data packet in the shared packet pool. The device driver can de-reference the pointer in the submission queue to read the data packet from the shared packet pool and write a completion status into the completion queue in response to reading the data packet from the shared packet pool.

In some embodiments, the device driver can return the data packet to the network interface in response to writing the completion status.

In some embodiments, the shared packet pool can include a transmit packet pool and a receive packet pool. In these embodiments, the network interface can write the data packet into the transmit packet pool and the device driver can de-reference the pointer to read the data packet from the transmit packet pool.

In some embodiments, the device driver can de-reference the pointer to read the data packet from the transmit packet pool on a per-packet basis.

In some embodiments, the network interface can allocate storage within the receive packet pool to write a second data packet and queue a second pointer into the submission queue that indicates a location of the second data packet in the receive packet pool. In these embodiments, the device driver can de-reference the second pointer in the submission queue to write data into the second data packet in the receive packet pool and write a second completion status into the completion queue in response to writing the data. In these embodiments, the device driver can de-reference the second pointer to write the data into a plurality of spans of a cloned object. In these embodiments, the second pointer can indicate a location of the plurality of spans of the cloned object. In these embodiments, the network interface can de-reference the second pointer to read the plurality of spans of the cloned object from the receive packet pool.

Some embodiments of this disclosure describe a method of operating a computer system. The method includes writing a data packet from a kernel space into a shared packet pool; queuing a pointer indicating a location of the data packet in the shared packet pool; de-referencing the pointer to read the data packet from the shared packet pool into a non-kernel space; and writing a completion status in response to reading the data packet from the shared packet pool.

In some embodiments, the method further includes returning the data packet to the kernel space in response to writing the completion status.

In some embodiments, writing the data packet includes writing the data packet into a transmit packet pool of the shared packet pool. In these embodiments, the de-referencing includes de-referencing the pointer to read the data packet from the transmit packet pool. In these embodiments, the de-referencing includes de-referencing the pointer to read the data packet from the transmit packet pool on a per-packet basis.

In some embodiments, the method further includes allocating storage within the receive packet pool to write a second data packet; queuing a second pointer that indicates a location of the second data packet in the receive packet pool; de-referencing the second pointer to write data from the non-kernel space into the second data packet in the receive packet pool; and writing a second completion status in response to writing the data. In some embodiments, the de-referencing the second pointer includes de-referencing the second pointer to write the data into a plurality of spans of a cloned object. In some embodiments, the second pointer can indicate a location of the plurality of spans of the cloned object. In some embodiments, the can method further include de-referencing the second pointer to read the clone object from the receive packet pool into the kernel space.

Some embodiments of this disclosure describe a non-transitory storage medium that can store one or more computer programs, the one or more computer programs, when executed by a computer system, configure the computer system to perform operations. The operations can include writing a data packet from a kernel space into a shared packet pool; queuing a pointer indicating a location of the data packet in the shared packet pool; de-referencing the pointer to read the data packet from the shared packet pool into a non-kernel space; and writing a completion status in response to reading the data packet from the shared packet pool.

In some embodiments, the operations can include returning the data packet to the kernel space in response to writing the completion status.

In some embodiments, the writing the data packet can include writing the data packet into a transmit packet pool of the shared packet pool. In these embodiments, the de-referencing can include de-referencing the pointer to read the data packet from the transmit packet pool. In these embodiments, the de-referencing can include de-referencing the pointer to read the data packet from the transmit packet pool on a per-packet basis. In these embodiments, the operations can include allocating space for a second data packet to be written into the receive packet pool; queuing a second pointer indicating a location of the second data packet in the receive packet pool; de-referencing the second pointer to write data from the non-kernel space into the second data packet in the receive packet pool; and writing a second completion status in response to writing the data. In these embodiments, the de-referencing the second pointer can include de-referencing the second pointer to write the data into a plurality of spans of a cloned object.

Other features and advantages of the present disclosure will immediately be recognized by persons of ordinary skill in the art with reference to the attached drawings and detailed description of exemplary embodiments as given below.

This Summary is provided merely for purposes of illustrating some embodiments to provide an understanding of the subject matter described herein. Accordingly, the above-described features are merely examples and should not be construed to narrow the scope of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the disclosure and, together with the description, further serve to explain the principles of the disclosure and enable a person of skill in the relevant art(s) to make and use the disclosure.

Figure 1:
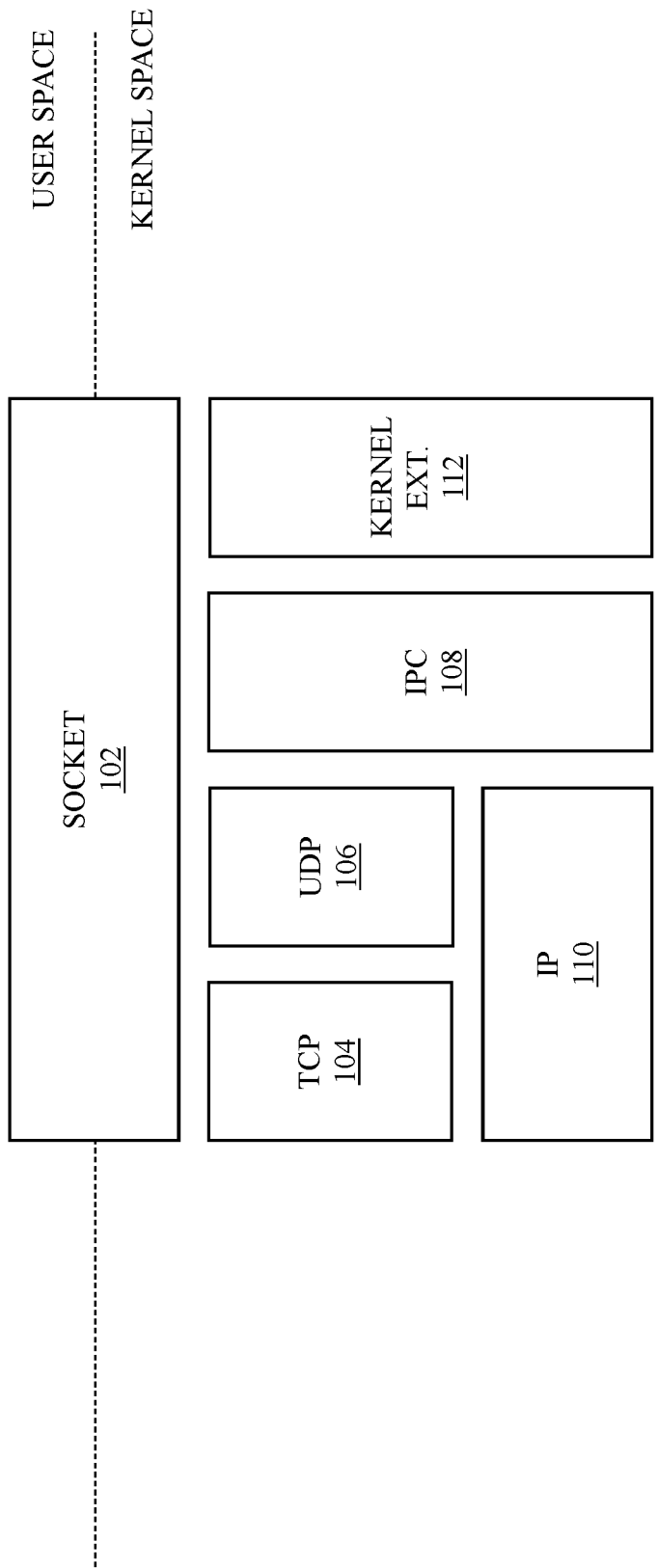
FIG. 1 is a logical representation of an exemplary network socket, useful for explaining various aspects of the present disclosure.

The disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The disclosure is described with reference to the accompanying drawings. In the drawings, generally, like reference numbers indicate identical or functionally similar elements. Additionally, generally, the left-most digit(s) of a reference number identifies the drawing in which the reference number first appears.

Exemplary Network Socket Technologies

FIG. 1 illustrates one logical representation of an exemplary network socket 102, useful for explaining various aspects of the exemplary networking interface. A network "socket" is a virtualized internal network endpoint for sending or receiving data at a single node in a computer network. A network socket may be created ("opened") or destroyed ("closed") and the manifest of network sockets may be stored as entries in a network resource table which may additionally include reference to various communication protocols (e.g., Transmission Control Protocol (TCP) 104, User Datagram Protocol (UDP) 106, Inter-Processor Communication (IPC) 108, etc.), destination, status, and any other operational processes (kernel extensions 112) and/or parameters); more generally, network sockets are a form of system resource.

As shown in FIG. 1, the socket 102 provides an application programming interface (API) that spans between the user space and the kernel space. An API is a set of clearly defined methods of communication between various software components. An API specification commonly includes, without limitation: routines, data structures, object classes, variables, remote calls and/or any number of other software constructs commonly defined within the computing arts.

As a brief aside, user space is a portion of system memory that a processor executes user processes from. User space is relatively freely and dynamically allocated for application software and a few device drivers. The kernel space is a portion of memory that a processor executes the kernel from. Kernel space is strictly reserved (usually during the processor boot sequence) for running privileged operating system (O/S) processes, extensions, and most device drivers. For example, each user space process normally runs in a specific memory space (its own "sandbox") and cannot access the memory of other processes unless explicitly allowed. In contrast, the kernel is the core of a computer's operating system; the kernel can exert complete control over all other processes in the system.

The term "operating system" may refer without limitation to software that controls and manages access to hardware. An O/S commonly supports processing functions such as e.g., task scheduling, application execution, input and output management, memory management, security, and peripheral access. As used herein, the term "application" refers to software that can interact with the hardware only via procedures and interfaces offered by the O/S.

The term "privilege" may refer without limitation to any access restriction or permission which restricts or permits processor execution. System privileges are commonly used within the computing arts to, inter alia, mitigate the potential damage of a computer security vulnerability. For instance, a properly privileged computer system can prevent malicious software applications from affecting data and task execution associated with other applications and the kernel.

As used herein, the term "in-kernel" and/or "kernel space" may refer without limitation to data and/or processes that are stored in, and/or have privilege to access the kernel space memory allocations. In contrast, the terms "non-kernel" and/or "user space" refers to data and/or processes that are not privileged to access the kernel space memory allocations. In particular, user space represents the address space specific to the user process, whereas non-kernel space represents address space which is not in-kernel, but which may or may not be specific to user processes.

As previously noted, the illustrated socket 102 provides access to Transmission Control Protocol (TCP) 104, User Datagram Protocol (UDP) 106, and Inter-Processor Communication (IPC) 108. TCP, UDP, and IPC are various suites of transmission protocols each offering different capabilities and/or functionalities. For example, UDP is a minimal message-oriented encapsulation protocol that provides no guarantees to the upper layer protocol for message delivery and the UDP layer retains no state of UDP messages once sent. UDP is commonly used for real-time, interactive applications (e.g., video chat, voice over IP (VoIP)) where loss of packets is acceptable. In contrast, TCP provides reliable, ordered, and error-checked delivery of data via a retransmission and acknowledgement scheme; TCP is generally used for file transfers where packet loss is unacceptable, and transmission latency is flexible.

As used herein, the term "encapsulation protocol" may refer without limitation to modular communication protocols in which logically separate functions in the network are abstracted from their underlying structures by inclusion or information hiding within higher level objects. For example, in one exemplary embodiment, UDP provides extra information (ports numbering).

As used herein, the term "transport protocol" may refer without limitation to communication protocols that transport data between logical endpoints. A transport protocol may include encapsulation protocol functionality.

Both TCP and UDP are commonly layered over an Internet Protocol (IP) 110 for transmission. IP is a connectionless protocol for use on packet-switched networks that provides a "best effort delivery". Best effort delivery does not guarantee delivery, nor does it assure proper sequencing or avoidance of duplicate delivery. Generally, these aspects are addressed by TCP or another transport protocol based on UDP.

As a brief aside, consider a web browser that opens a webpage; the web browser application would generally open a number of network sockets to download and/or interact with the various digital assets of the webpage (e.g., for a relatively common place webpage, this could entail instantiating ~300 sockets). The web browser can write (or read) data to the socket; thereafter, the socket object executes system calls within kernel space to copy (or fetch) data to data structures in the kernel space.

As used herein, the term "domain" may refer without limitation to a self-contained memory allocation e.g., user space, driver space, kernel space, etc. A "domain crossing" may refer without limitation to a transaction, event, or process that "crosses" from one domain to another domain. For example, writing to a network socket from the user space to the kernel space constitutes a domain crossing access.

In the context of a Berkeley Software Distribution (BSD) based networking implementation, data that is transacted within the kernel space is stored in memory buffers that are also commonly referred to as "mbufs". Each mbuf is a fixed size memory buffer that is used generically for transfers (mbufs are used regardless of the calling process e.g., TCP, UDP, etc.). Arbitrarily sized data can be split into multiple mbufs and retrieved one at a time or (depending on system support) retrieved using "scatter-gather" direct memory access (DMA) ("scatter-gather" refers to the process of gathering data from, or scattering data into, a given set of buffers). Each mbuf transfer is parameterized by a single identified mbuf.

Notably, each socket transfer can create multiple mbuf transfers, where each mbuf transfer copies (or fetches) data from a single mbuf at a time. As a further complication, because the socket spans both: (i) user space (limited privileges) and (ii) kernel space (privileged without limitation), the socket transfer verifies that each mbuf copy into/out of kernel space is valid. More directly, the verification process ensures that the data access is not malicious, corrupted, and/or malformed (i.e., that the transfer is appropriately sized and is to/from an appropriate area)

The processing overhead associated with domain crossing is a non-trivial processing cost. Processing cost affects user experience both directly and indirectly. A processor has a fixed amount of processing cycles every second; thus cycles that are used for transfer verification detract from more user perceptible tasks (e.g., rendering a video or audio stream). Additionally, processor activity consumes power; thus, increases in processing overhead increases power consumption.

Referring back to FIG. 1, in addition to the generic TCP 104, UDP 106, and IPC 108 communication suites, the illustrated socket 102 also may provide access to various kernel extensions 112. A kernel extension is a dynamically loaded bundle of executable code that executes from kernel space. Kernel extensions may be used to perform low level tasks that cannot be performed in user space. These low-level tasks typically fall into one or more of: low-level device drivers, network filters, and/or file systems.

Examples of sockets and/or extensions include without limitation: route (IP route handling), ndrv (packet 802.1X handling), key (key management), unix (translations for Unix systems), kernel control, kernel events, parental controls, intrusion detection, content filtering, hypervisors, and/or any number of other kernel tasking. Kernel extensions and public APIs enable, for example, third party software developers to develop a wide variety of applications that can interact with a computer system at even the lowest layers of abstraction. For example, kernel extensions can enable socket level filtering, IP level filtering, and even device interface filtering. In the current consumer applications space, many emerging technologies now rely on closely coupled interfaces to the hardware and kernel functionality. For example, many security applications "sniff" network traffic to detect malicious traffic or filter undesirable content; this requires access to other application sandboxes (a level of privilege that is normally reserved for the kernel).

Unfortunately, third party kernel extensions can be dangerous and/or undesirable. As previously noted, software applications are restricted for security and stability reasons; however the kernel is largely unrestricted. A third party kernel extension can introduce instability issues because the third party kernel extensions run in the same address space as the kernel itself (which is outside the purview of exemplary memory read/write protections based on memory allocations). Illegal memory accesses can result in segmentation faults and memory corruptions. Furthermore, unsecure kernel extension can create security vulnerabilities that can be exploited by malware. Additionally, even where correctly used, a kernel extension can expose a user's data to the third party software developer. This heightened level of access may raise privacy concerns (e.g., the third party developer may have access to browsing habits, etc.).

Exemplary Performance Optimization Technologies

Figure 2:
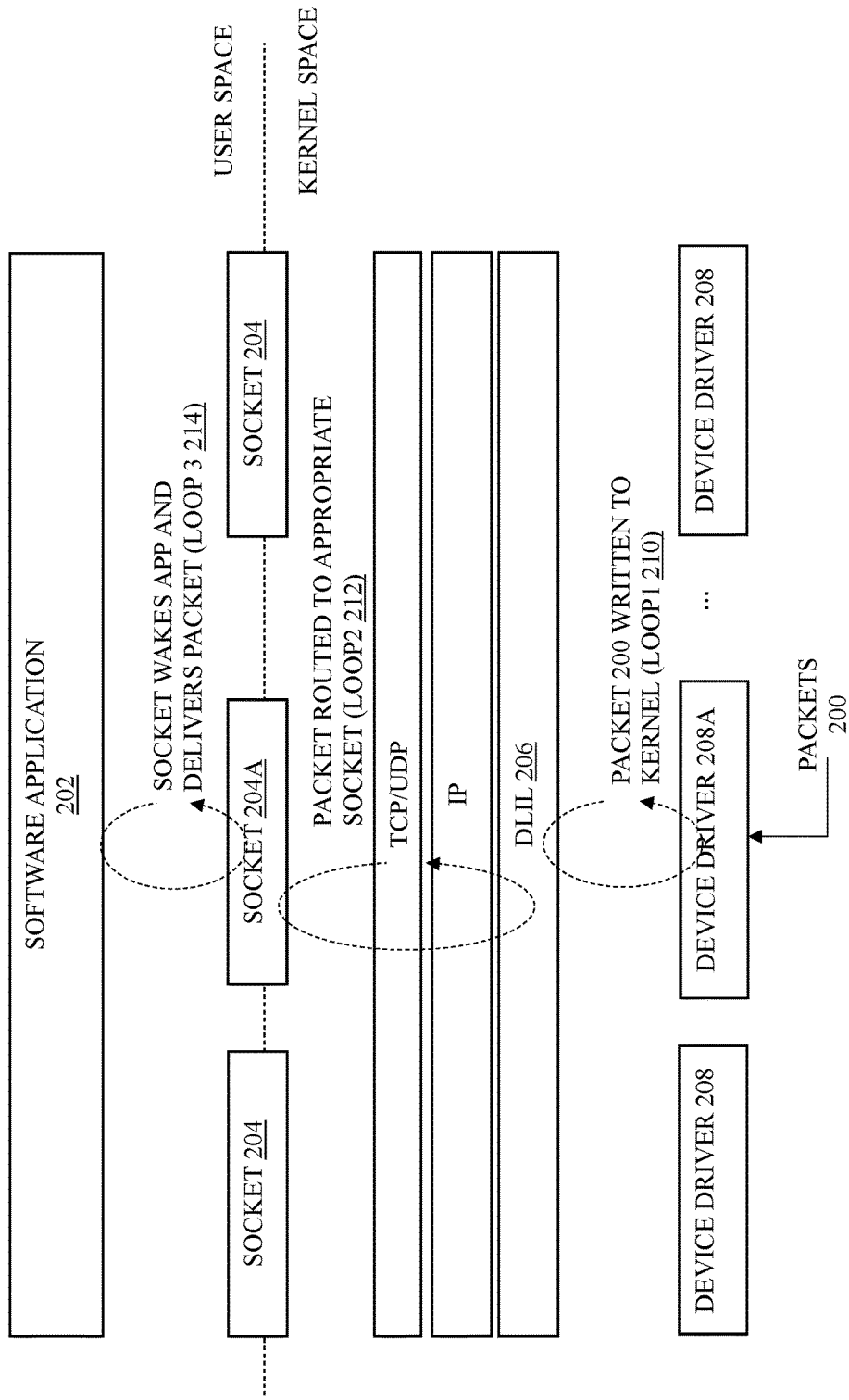
FIG. 2 is a logical representation of a computer system that implements Input/Output (I/O) network control, useful for explaining various aspects of the present disclosure.

FIG. 2 illustrates one logical representation of a computer system that implements Input/Output (I/O) network control, useful for explaining various aspects of exemplary network optimization. As depicted therein, a software application 202 executing from user space opens multiple sockets 204 to communicate with e.g., a web server. Each of the sockets interfaces with a Data Link Interface Layer (DLIL) 206. The DLIL 206 provides a common interface layer to each of the various physical device drivers which can handle the subsequent data transfer (e.g., Ethernet, Wi-Fi, cellular, etc.). The DLIL performs a number of system-wide holistic network traffic management functions. In one such implementation, the DLIL is responsible for BSD Virtual Interfaces, IOKit Interfaces (e.g., DLIL is the entity by which IOKit based network drivers are connected to the networking stack), Active Queue Management (AQM), flow control and advisory action, etc. In most cases, the device driver 208 may be handled by an external device (e.g., a baseband co-processor), thus the DLIL 206 is usually (but not always) the lowest layer of the network communication stack.

During normal operation, the computer system can logically segment its tasks to optimize overall system operation. In particular, a processor can execute a task, and then "context switch" to another task, thereby ensuring that any single process thread does not monopolize processor resources from start to finish. More directly, a context switch is the process of storing the state of a process, or of a thread, so that it can be restored and execution resumed from the same point later. This allows multiple processes to share a single processor. However, excessive amounts of context switching can slow processor performance down. Notably, while the present discussion is primarily discussed within the context of a single processor for ease of understanding, multi-processor systems have analogous concepts (e.g., multiple processors also perform context switching, although contexts may not necessarily be resumed by the same processor).

For example, consider the following example of a packet reception. Packets arrive at the device driver 208A. The hardware managed by the device driver 208A may notify the processor via e.g., a doorbell signal (e.g., an interrupt). The device driver 208A work loop thread handles the hardware interrupt/doorbell, then signals the DLIL thread (Loop 1 210). The processor services the device driver 208A with high priority, thereby ensuring that the device driver 208A operation is not bottlenecked (e.g., that the data does not overflow the device driver's memory and/or that the device driver does not stall). Once the data has been moved out of the device driver, the processor can context switch to other tasks.

At a later point, the processor can pick up the DLIL 206 execution process again. The processor determines which socket the packets should be routed to (e.g., socket 204A) and routes the packet data appropriately (Loop 2 212). During this loop, the DLIL thread takes each packet, and moves each one sequentially into the socket memory space. Again, the processor can context switch to other tasks so as to ensure that the DLIL task does not block other concurrently executed processing. Subsequently thereafter, when the socket has the complete packet data transfer the processor can wake the user space application and deliver the packet into user space memory (Loop 3 214). Generally, user space applications are treated at lower priority than kernel tasks; this can be reflected by larger time intervals between suspension and resumption. While the foregoing discussion is presented in the context of packet reception, artisans of ordinary skill in the related arts will readily appreciate, given the contents of the present disclosure, that the process is substantially reversed for packet transmission.

As demonstrated in the foregoing example, context switching ensures that tasks of different processing priority are allocated commensurate amounts of processing time. For example, a processor can spend significantly more time executing tasks of relatively high priority, and service lower priority tasks on an as-needed basis. As a brief aside, human perception is much more forgiving than hardware operation. Consequently, kernel tasks are generally performed at a much higher priority than user space applications. The difference in priority between kernel and user space allows the kernel to handle immediate system management (e.g., hardware interrupts, and queue overflow) in a timely manner, with minimal noticeable impact to the user experience.

Moreover, FIG. 2 is substantially representative of every implementation of the exemplary network communications stack. While implementations may vary from this illustrative example, virtually all networking stacks share substantially the same delivery mechanism. The exemplary network communications stack schema (such as the BSD architecture and derivatives therefrom) have been very popular for the past 30 years due to its relative stability of implementation and versatility across many different device platforms. For example, the Assignee hereof has developed and implemented the same networking stack across virtually all of its products (e.g., MacBook®, iMac®, iPad®, and iPhone®, Apple Watch®, etc.).

Unfortunately, changing tastes in consumer expectations cannot be effectively addressed with the one-size-fits-all model and the conservative in-kernel exemplary networking stack. Artisans of ordinary skill in the related arts will readily appreciate, given the contents of the present disclosure, that different device platforms have different capabilities; for example, a desktop processor has significantly more processing and memory capability than a mobile phone processor. More directly, the "one-size-fits-all" solution does not account for the underlying platform capabilities and/or application requirements, and thus is not optimized for performance. Fine-tuning the exemplary networking stack for performance based on various "tailored" special cases results in an inordinate amount of software complexity which is untenable to support across the entire ecosystem of devices.

Exemplary Emerging Use Cases

Figure 3:
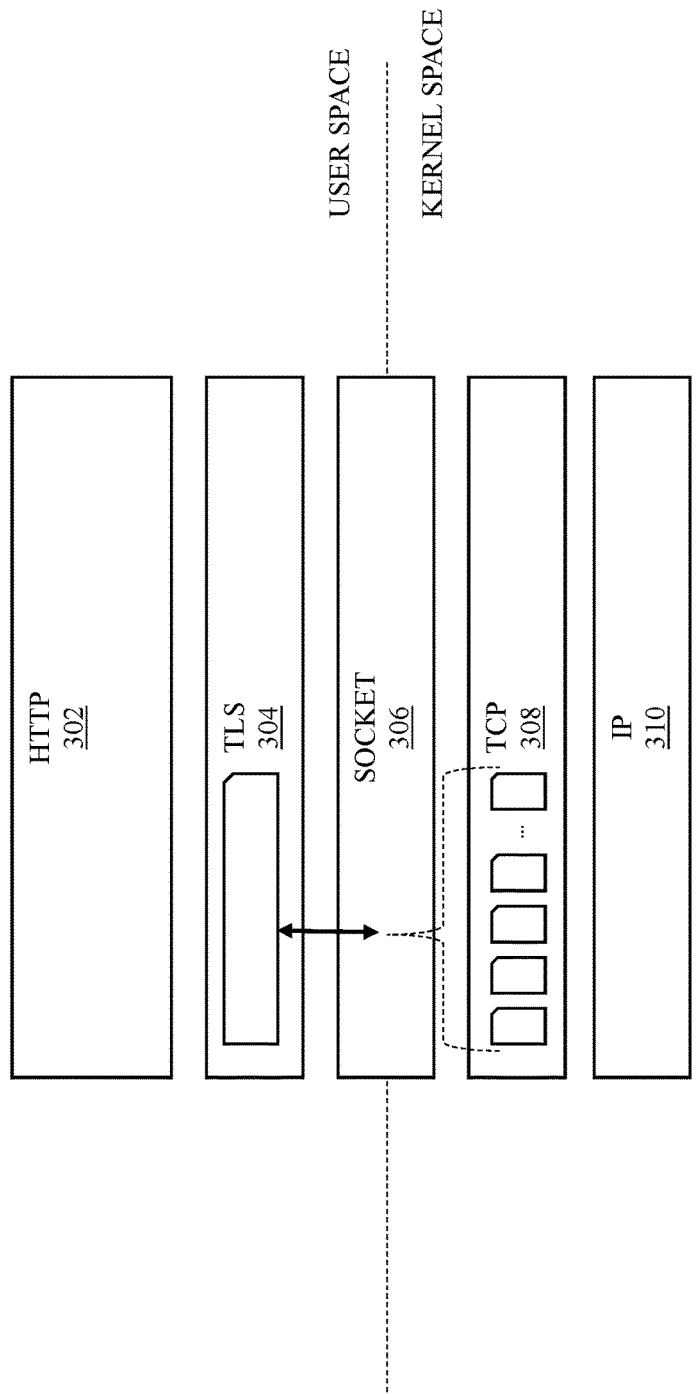
FIG. 3 is a logical block diagram of one exemplary implementation of Transport Layer Security (TLS), useful for explaining various aspects of the present disclosure.

FIG. 3 illustrates a logical block diagram of one exemplary implementation of Transport Layer Security (TLS) (the successor to Secure Sockets Layer (SSL)), useful to explain user/kernel space integration complexities of emerging use cases. As shown, an application executing from user space can open a Hypertext Transfer Protocol (HTTP) session 302 with a TLS security layer 304 in order to securely transfer data (Application Transport Security (ATS) services) over a network socket 306 that offers TCP/IP transport 308, 310.

As a brief aside, TLS is a record based protocol; in other words, TLS uses data records which are arbitrarily sized (e.g., up to 16 kilobytes). In contrast, TCP is a byte stream protocol (i.e., a byte has a fixed length of eight (8) bits). Consequently, the TCP layer subdivides TLS records into a sequentially ordered set of bytes for delivery. The receiver of the TCP byte stream reconstructs TLS records from the TCP byte stream by receiving each TCP packet, re-ordering the packets according to sequential numbering to recreate the byte stream and extracting the TLS record from the aggregated byte stream. Notably, every TCP packet of the sequence should be present before the TLS record can be reconstructed. Even though TCP can provide reliable delivery under lossy network conditions, there are a number of situations where TLS record delivery could fail. For example, under ideal conditions TCP isolates packet loss from its client (TLS in this example), and a single TCP packet loss should not result in failed TLS record delivery. However, the TLS layer or the application above may incorporate a timeout strategy in a manner that is unaware of the underlying TCP conditions. Thus, if there's significant packet loss in the network, the TLS timeout may be hit (and thus result in a failure to the application) even though TCP would normally provide reliable delivery.

Referring back to FIG. 3, virtually every modern operating system executes TLS from user space when e.g., securely connecting to other network entities, inter alia, a web browser instance and a server. But exemplary implementations of TLS are not executed from the kernel (or other privileged software layer) due to e.g., the complexity of error handling within the kernel. However, as a practical matter, TLS would operate significantly better with information regarding the current networking conditions (held in the kernel).

Ideally, the TLS layer should set TLS record sizes based on network condition information. In particular, large TLS records can efficiently use network bandwidth, but require many successful TCP packet deliveries. In contrast, small TLS records incur significantly more network overhead, but can survive poor bandwidth conditions. Unfortunately, networking condition information is lower layer information that is available to the kernel space (e.g., the DLIL and device drivers), but generally restricted from user space applications. Some third party application developers and device manufacturers have incorporated kernel extensions (or similar operating system capabilities) to provide network condition information to the TLS user space applications; however, kernel extensions are undesirable due to the aforementioned security and privacy concerns. Alternately, some third party applications infer the presence of lossy network conditions based on historic TLS record loss. Such inferences are an indirect measure and significantly less accurate and lag behind real-time information (i.e., previous packet loss often does not predict future packet loss).

Figure 4:
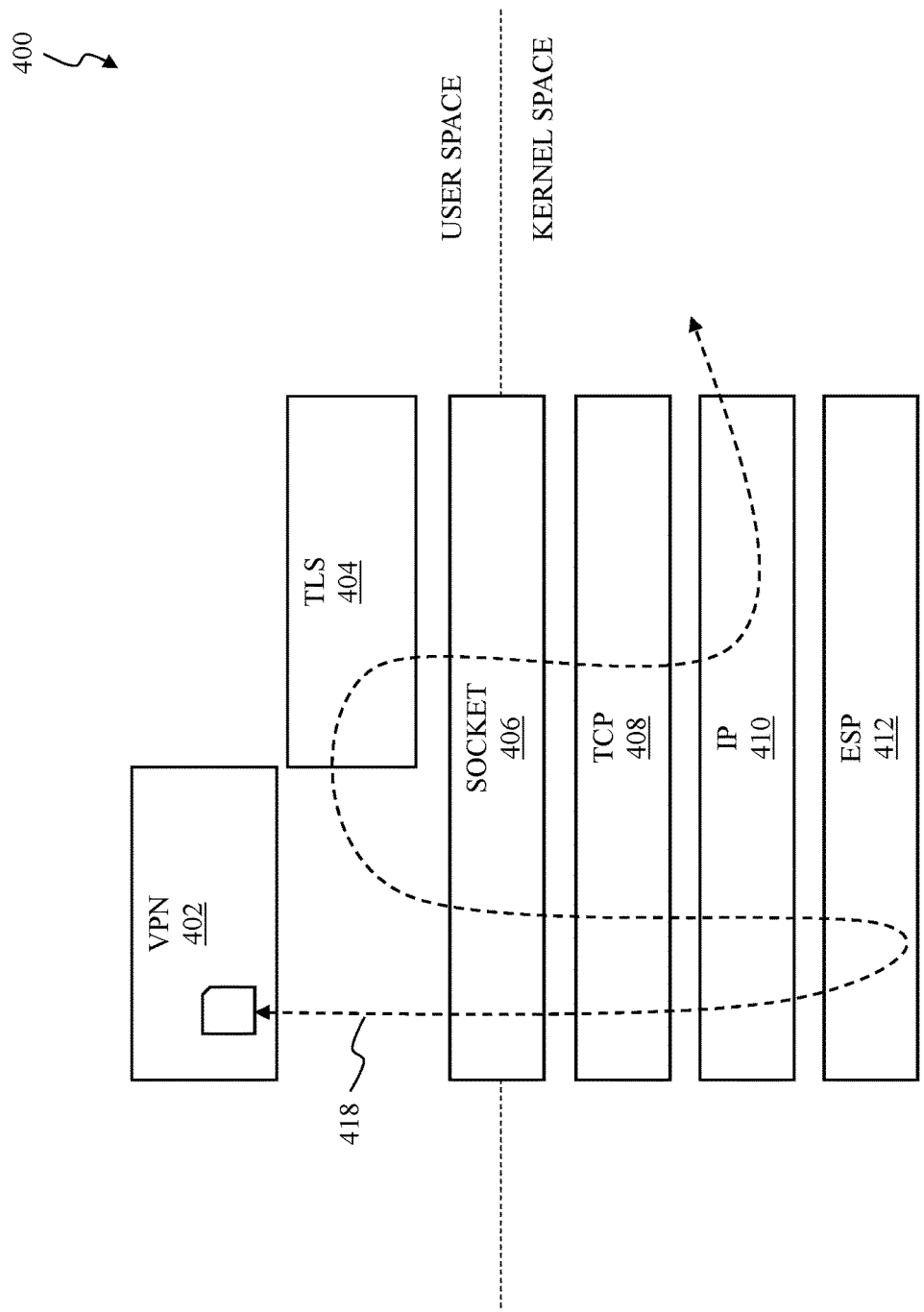
FIG. 4 is a logical block diagram of an exemplary implementation of a Virtual Private Network (VPN), useful for explaining various aspects of the present disclosure.

FIG. 4 illustrates a logical block diagram of an exemplary implementation of a Virtual Private Network (VPN), useful to explain recursive/cross-layer protocol layer complexities of emerging use cases. As shown, an application executing from user space can open a Virtual Private Network (VPN) session 402 over a network socket 406 that offers TCP/IP transport 408, 410. The VPN session is secured with Encapsulating Security Protocol (ESP) 412. The encrypted packet is securely tunneled via TLS 404 (in user space) and recursively sent again over TCP/IP transport 408, 410.

As illustrated within FIG. 4, the exemplary VPN tunnel starts in user space, crosses into kernel space, returns back to user space, and then crosses back into kernel space before being transferred. Each of the domain crossings results in costly context switches and data shuffling both of which are processor intensive and inefficient. More directly, every time data traverses from user space to kernel space, the data should be validated (which takes non-trivial processing time). Additionally, context switching can introduce significant latency while the task is suspended. Artisans of ordinary skill in the related arts, given the contents of the present disclosure, will readily appreciate that the exemplary recursive cross-layer transaction of FIG. 4 is merely illustrative of a broad range of applications which use increasingly exotic protocol layer compositions. For example, applications that traverse the application proxy/agent data path commonly require tunneling TCP (kernel space) over application proxy/agent data path (user space) over UDP/IP (kernel space).

Another common implementation is IP (kernel space) over Quick UDP Internet Connections (QUIC) (user space) over UDP/IP (kernel space).

Figure 5:
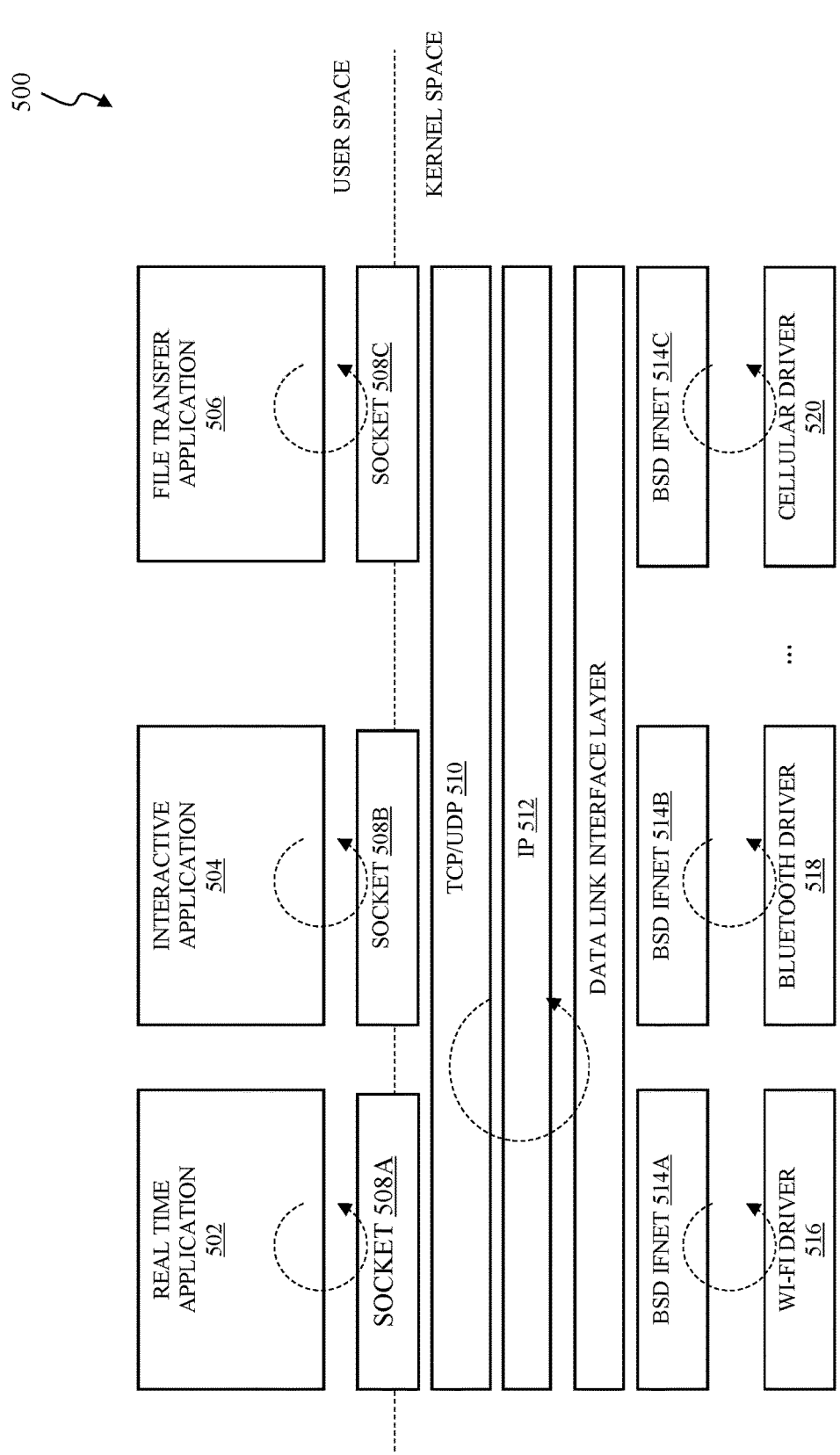
FIG. 5 illustrates a logical block diagram of an exemplary implementation of application-based tuning, useful to explain various other workload optimization complexities of emerging use cases.

FIG. 5 illustrates a logical block diagram of an exemplary implementation of application-based tuning, useful to explain various other workload optimization complexities of emerging use cases. As shown, three (3) different concurrently executed applications (e.g., a real time application 502, interactive application 504, and file transfer applications 506) in user space, each open a session over network sockets 508 (508A, 508B, 508C) that offer TCP/UDP/IP transport 510/512. Depending on the type of physical interface required, the sessions are switched to BSD network interfaces (ifnet) 514 (514A, 514B, 514C) which handle the appropriate technology. Three different illustrated technology drivers are shown: Wi-Fi 516, Bluetooth 518, and cellular 520.

It is well understood within the networking arts that different application types are associated with different capabilities and requirements. One such example is real time applications 502, commonly used for example, streaming audio/visual and/or other "live" data. Real time data has significant latency and/or throughput restrictions; moreover, certain real time applications may not require (and/or support) retransmission for reliable delivery of lost or corrupted data. Instead, real time applications may lower bandwidth requirements to compensate for poor transmission quality (resulting in lower quality, but timely, delivered data).

Another such example is interactive applications 504, commonly used for example, human input/output. Interactive data should be delivered at latencies that are below the human perceptible threshold (within several milliseconds) to ensure that the human experience is relatively seamless. This latency interval may be long enough for a retransmission, depending on the underlying physical technology. Additionally, human perception can be more or less tolerant of certain types of data corruptions; for example, audio delays below 20 ms are generally imperceptible, whereas audio corruptions (pops and clicks) are noticeable. Consequently, some interactive applications may allow for some level of error correction and/or adopt less aggressive bandwidth management mechanisms depending on the acceptable performance requirements for human perception.

In contrast to real time applications and interactive applications, file transfer applications 506 require perfect data fidelity without latency restrictions. To these ends, most file transfer technologies support retransmission of lost or corrupted data, and retransmission can have relatively long attempt intervals (e.g., on the order of multiple seconds to a minute). Similarly, within the communication arts, different communication technologies are associated with different capabilities and requirements. For example, Wi-Fi 516 (wireless local area networking based on IEEE 802.11) is heavily based on contention based access and is best suited for high bandwidth deliveries with reasonable latency. Wi-Fi is commonly used for file transfer type applications. Bluetooth 518 (personal area networking) is commonly used for low data rate and low latency applications. Bluetooth is commonly used for human interface devices (e.g., headphones, keyboards, and mice). Cellular network technologies 520 often provide non-contention-based access (e.g., dedicated user access) and can be used over varying geographic ranges. Cellular voice or video delivery is a good example of streaming data applications. Artisans of ordinary skill in the related arts will readily recognize that the foregoing examples are purely illustrative, and that different communication technologies are often used to support a variety of different types of application data. For example, Wi-Fi 516 can support file transfer, real time data transmission and/or interactive data with equivalent success.

Referring back to FIG. 5, the presence of multiple concurrently executing applications of FIG. 5 (real time application 502, interactive application 504, and file transfer applications 506) illustrates the complexities of multi-threaded operation. As shown therein, the exemplary multi-threaded operation incurs a number of server loops. Each server loop represents a logical break in the process during which the processor can context switch (see also aforementioned discussion of Exemplary Performance Optimization Technologies, and corresponding FIG. 2). Moreover, in the computing arts, a "locking" synchronization mechanism is used by the kernel to enforce access limits (e.g., mutual exclusion) on resources in multi-threaded execution. During operation, each thread acquires a lock before accessing the corresponding locked resources data. In other words, at any point in time, the processor is necessarily limited to only the resources available to its currently executing process thread.

Unfortunately, each of the applications has different latency, throughput and processing utilization requirements. Since, each of the network interfaces is sending and receiving data at different times, in different amounts, and with different levels of priority. From a purely logistical standpoint, the kernel is constantly juggling between high priority kernel threads (to ensure that the high priority hardware activities do not stall out) while still servicing each of its concurrently running applications to attempt to provide acceptable levels of service. In some cases, however, the kernel is bottlenecked by the processor's capabilities. Under such situations, some threads can be deprioritized; currently, the exemplary networking stack architecture is unable it clearly identify which threads can be deprioritized while still providing acceptable user service. For example, consider an "expected use" device of FIG. 5; the processor is designed for the expected use case of providing streaming video. Designing for expected use cases allows the device manufacturer to use less capable, but adequate components thereby reducing bill of materials (BOM) costs and/or offering features at a reasonable price point for consumers. In this case, a processor is selected that nominally meets the requirements for a streaming video application that is receiving streaming video data via one of the network interfaces (e.g., the Wi-Fi interface), and constantly servicing the kernel threads associated with it. Rendering the video with a real time application 502 from the received data is a user space application that is executed concurrently but at a significantly lower priority. During expected usage, the video rendering is adequate.

Unfortunately, the addition of an unexpected amount of additional secondary interactive applications 504 (e.g., remote control interface, headphones, and/or other interface devices) and/or background file transfer applications can easily overwhelm the processor. Specifically, the primary real time application does not get enough CPU cycles to run within its time budget, because the kernel threads handling networking are selected at a higher priority. In other words, the user space application is not able to depress the priority of kernel networking threads (which are servicing both the primary and secondary processes). This can result in significantly worse user experience when the video rendering stalls out (video frame misses or video frame drops); whereas simply slowing down a file transfer or degrading the interaction interface may have been preferable.

Prior art solutions have tailored software for specific device implementations (e.g., the Apple TV®). For example, the device can be specifically programmed for an expected use. However, tailored solutions are becoming increasingly common and by extension the exceptions have swallowed the more generic use case. Moreover, tailored solutions are undesirable from multiple software maintenance standpoints. Devices have limited productive lifetimes, and software upkeep is non-trivial. Ideally, a per-application or per-profile workload optimization would enable a single processor (or multiple processors) to intelligently determine when and/or how too intelligently context switch and/or prioritize its application load (e.g., in the example of FIG. 5, to prioritize video decode). Unfortunately, such solutions are not feasible within the context of the exemplary generic network sockets and generic network interfaces to a monolithic communications stack.

Exemplary User Space Networking Architecture

A networking stack architecture and technology that caters to the needs of non-kernel-based networking use cases is disclosed herein. Unlike prior art monolithic networking stacks, the exemplary networking stack architecture described hereinafter includes various components that span multiple domains (both in-kernel, and non-kernel), with varying transport compositions, workload characteristics and parameters. The user space networking stack architecture provides an efficient infrastructure to transfer data across domains (user space, non-kernel, and kernel). Unlike the exemplary networking paradigm that hides the underlying networking tasks within the kernel and substantially limits control thereof by any non-kernel applications, the various embodiments described herein enable faster and more efficient cross domain data transfers.

Various embodiments of the present disclosure provide a faster and more efficient packet input/output (I/O) infrastructure than prior art techniques. Specifically, unlike exemplary networking stacks that use a "socket" based communication, disclosed embodiments can transfer data directly between the kernel and user space domains. Direct transfer reduces the per-byte and per-packet costs relative to socket-based communication. Additionally, direct transfer can improve observability and accountability with traffic monitoring.

Figure 6:
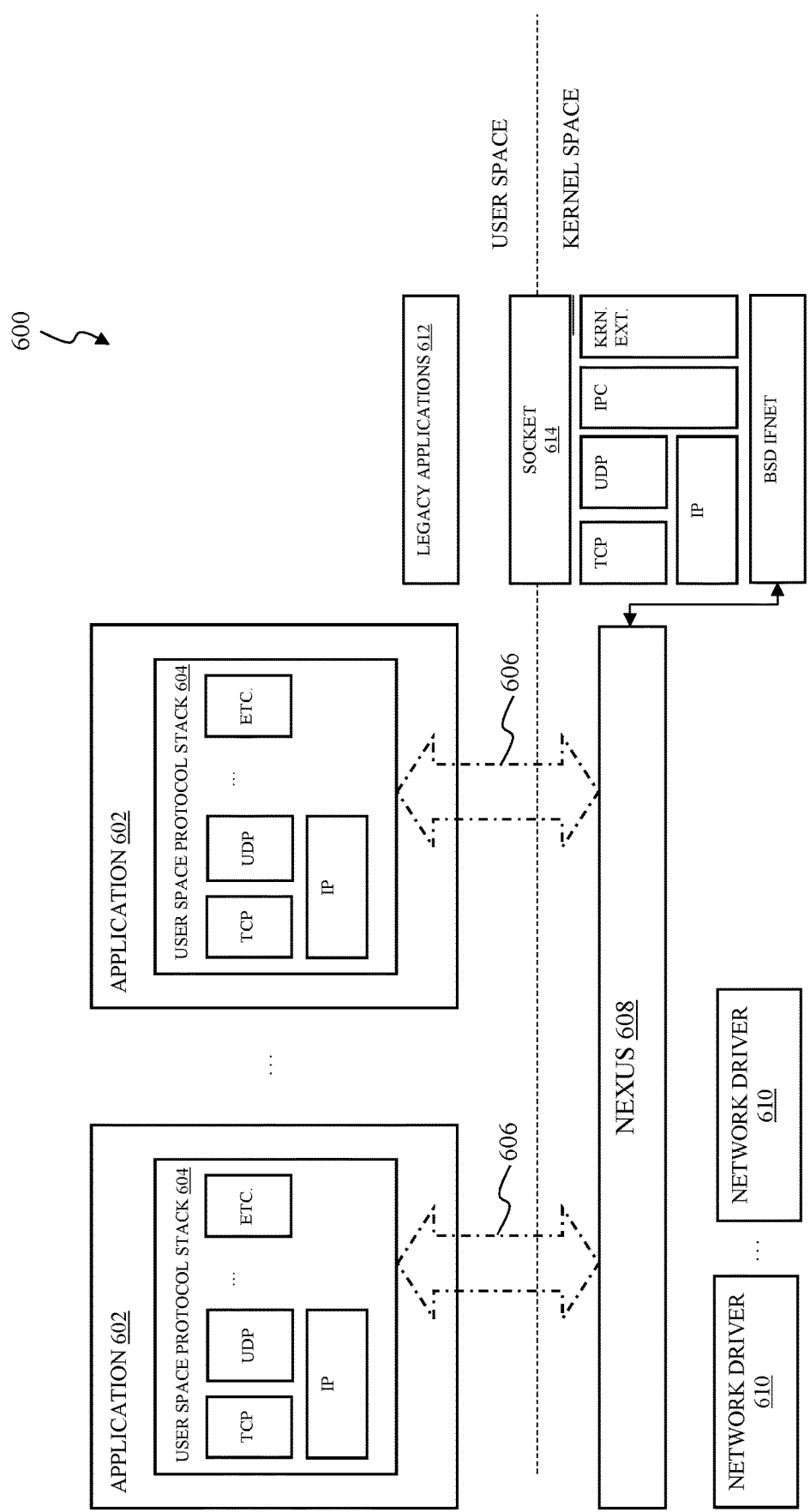
FIG. 6 illustrates one logical representation of an exemplary user space networking stack architecture, in accordance with the various aspects of the present disclosure.

FIG. 6 illustrates one logical representation of an exemplary user space networking stack architecture, in accordance with the various aspects of the present disclosure. While the system depicts a plurality of user space applications 602 and/or legacy applications 612, artisans of ordinary skill will readily appreciate given the contents of present disclosure that the disclosed embodiments may be used within single application systems with equivalent success.

As shown, a user space application 602 can initiate a network connection by instancing user space protocol stacks 604. Each user space protocol stacks includes network extensions for example, TCP/UDP/QUIC/IP, cryptography, framing, multiplexing, tunneling, and/or any number of other networking stack functionalities. Each user space protocol stack 604 communicates with one or more nexuses 608 via a channel input/output (I/O) 606. Each nexus 608 manages access to the network drivers 610. Additionally, shown is legacy application 612 support via the exemplary network socket technologies 614. While the illustrated embodiment shows nexus connections to both user space and in-kernel networking stacks, it is appreciated that the nexus may also enable e.g., non-kernel networking stacks (such as may be used by a daemon or other non-kernel, non-user process).

The following topical sections hereinafter describe the salient features of the various logical constructs in greater detail.

Exemplary User Space I/O Infrastructure

In one embodiment, the non-kernel networking stack provides a direct channel input output (I/O) 606. In one such implementation, the channel I/O 606 is included as part of the user space protocol stack 604. More directly, the channel I/O 606 enables the delivery of packets as a raw data I/O into kernel space with a single validation (e.g., only when the user stack provides the data to the one or more nexuses 608). The data can be directly accessed and/or manipulated in situ, the data need not be copied to an intermediary buffer.

In one exemplary implementation, a channel is an I/O scheme leveraging kernel managed shared memory. During an access, the channel I/O is presented to the process (e.g., the user process or kernel process) as a file descriptor-based object, rather than as data. In order to access the data, the process de-references the file descriptor for direct access to the shared memory within kernel space. In one such implementation, the file descriptor-based object based I/O is compatible with exemplary operating system signaling and "eventing" (event notification/response) mechanisms. In one exemplary variant, the channel I/O is based on Inter Process Communication (IPC) packets.

As used herein, the term "descriptor" may refer without limitation to data structures that indicate how other data is stored. Descriptors generally include multiple parameters and can be used to identify more complex data structures; for example, a descriptor may include one or more of type, size, address, tag, flag, headers, footers, metadata, structural links to other data descriptors or locations, and/or any other number of format or construction information.

Within the context of the present disclosure, as used herein, the term "pointer" may refer without limitation to a specific reference data type that "points" or "references" a location of data in memory. Typically, a pointer stores a memory address that is interpreted by a compiler as an absolute location in system memory or a relative location in system memory based on e.g., a base address, reference address, memory window, or other memory subset. During operation, a pointer is "de-referenced" to recover the data that is stored in the location of memory.

As used herein, the term "metadata" refers to data that describes data. Metadata varies widely in application, but generally falls into one of the descriptive, structural, and/or administrative categories. Descriptive metadata describes data in a manner to enable e.g., discovery and/or identification. Common examples include without limitation e.g., type, size, index tags, and keywords. Structural metadata describes the structure of the data e.g., how compound objects are put together. Common examples include without limitation e.g., prefix, postfix, table of contents, order, and/or any other information that describes the relationships and other characteristics of digital materials. Administrative metadata provides information to help manage a resource; common examples include e.g., authorship and creation information, access privileges, and/or error checking and security-based information (e.g., cyclic redundancy checks (CRC), parity, etc.).

In one embodiment, the channel I/O can be further leveraged to provide direct monitoring of its corresponding associated memory. More directly, unlike exemplary data transfers which are based on mbuf based divide/copy/move, etc., the channel I/O can provide (with appropriate viewing privileges) a direct window into the memory accesses of the system. Such implementations further simplify software development as debugging and/or traffic monitoring can be performed directly on traffic. Direct traffic monitoring can reduce errors attributed to false positives/false negatives caused by e.g., different software versioning, task scheduling, compiler settings, and/or other software introduced inaccuracies.

In one embodiment, the in-kernel network device drivers (e.g. Wi-Fi, Cellular, Ethernet) use simplified data movement models based on the aforementioned channel I/O scheme. More directly, the user space networking stacks can directly interface to each of the various different technology-based network drivers via channel I/O; in this manner, the user space networking stacks do not incur the exemplary data mbuf based divide/copy/move penalties. Additionally, user space applications can directly access user space networking components for immediate traffic handling and processing.

Exemplary Nexus

In one embodiment, the networking stack connects to one or more nexus 608. In one such implementation, the nexus 608 is a kernel space process that arbitrates access to system resources including, without limitation e.g., shared memory within kernel space, network drivers, and/or other kernel or user processes. In one such variant, the nexus 608 aggregates one or more channels 606 together for access to the network drivers 610 and/or shared kernel space memory.

In one exemplary implementation, a nexus is a kernel process that determines the format and/or parameters of the data flowing through its connected channels. In some variants, the nexus may further perform ingress and/or egress filtering.

The nexus may use the determined format and/or parameter information to facilitate one-to-one and one-to-many topologies. For example, the nexus can create user pipes for process-to-process channels; kernel-pipes for process-to-kernel channels; network interfaces for direct channel connection from a process to in-kernel network drivers, or legacy networking stack interfaces; and/or flow-switches for multiplexing flows across channels (e.g., switching a flow from one channel to one or more other channels).

Additionally, in some variants the nexus may provide the format, parameter, and/or ingress egress information to kernel processes and/or one or more appropriately privileged user space processes.

In one embodiment, the nexus 608 may additionally ensure that there is fairness and/or appropriately prioritize each of its connected stacks. For example, within the context of FIG. 6, the nexus 608 balances the network priorities of both the exemplary user space application networking stacks 604, as well as providing fair access for legacy socket-based access 614. For example, as previously alluded to, exemplary networking stacks could starve user space applications because the kernel threads handling the legacy networking stack operated at higher priorities than user space applications. However, the exemplary nexus 608 ensures that legacy applications do not monopolize system resources by appropriately servicing the user space network stacks as well as the legacy network stack.

In one such embodiment, in-kernel, non-kernel, and/or user space infrastructures ensure fairness and can reduce latency due to e.g., buffer bloat (across channels in a given nexus, as well as flows within a channel). In other words, the in-kernel and/or user space infrastructures can negotiate proper buffering sizes based on the expected amount of traffic and/or network capabilities for each flow. By buffering data according to traffic and/or network capability, buffers are not undersized or oversized.

As a brief aside, "buffer bloat" is commonly used to describe e.g., high latency caused by excessive buffering of packets. Specifically, buffer bloat may occur when excessively large buffers are used to support a real time streaming application. As a brief aside, TCP retransmission mechanism relies on measuring the occurrence of packet drops to determine the available bandwidth. Under certain congestion conditions, excessively large buffers can prevent the TCP feedback mechanism from correctly inferring the presence of a network congestion event in a timely manner (the buffered packets "hide" the congestion, since they are not dropped). Consequently, the buffers have to drain before TCP congestion control resets and the TCP connection can correct itself.

Referring back to FIG. 6, in one embodiment, Active Queue Management (AQM) can be implemented in the kernel across one or more (potentially all) of the flow-switch clients (user space and in-kernel networking stack instances). AQM refers to the intelligent culling of network packets associated with a network interface, to reduce network congestion. By dropping packets before the queue is full, the AQM ensures no single buffer approaches its maximum size, and TCP feedback mechanisms remain timely (thereby avoiding the aforementioned buffer bloat issues).

While the foregoing example is based on "fairness" standard, artisans of ordinary skill in the related arts will readily appreciate that other schemes may be substituted with equivalent success given the contents of the present disclosure. For example, some embodiments may dynamically or statically service the user application networking space with greater or less weight compared to the legacy socket-based access. For example, user application networking space may be more heavily weighted to improve overall performance or functionality, whereas legacy socket-based access may be preferred where legacy applications are preferentially supported.

Exemplary Network Extensions

In one embodiment of the present disclosure, a network extension is disclosed. A network extension is an agent-based extension that is tightly coupled to network control policies. The agent is executed by the kernel and exposes libraries of network control functionality to user space applications. During operation, user space software can access kernel space functionality through the context and privileges of the agent.

As used herein, the term "agent" may refer without limitation to a software agent that acts for a user space application or other program in a relationship of agency with appropriate privileges. The agency relationship between the agent and the user space application implies the authority to decide which, if any, action is appropriate given the user application and kernel privileges. A software agent is privileged to negotiate with the kernel and other software agents regarding without limitation e.g., scheduling, priority, collaboration, visibility, and/other sharing of user space and kernel space information. While the agent negotiates with the kernel on behalf of the application, the kernel ultimately decides on scheduling, priority, etc.

Various benefits and efficiencies can be gained through the use of network extensions. In particular, user space applications can control the protocol stack down to the resolution of exposed threads (i.e., the threads that are made available by the agent). In other words, software agents expose specific access to lower layer network functionality which was previously hidden or abstracted away from user space applications. For example, consider the previous examples of TLS record sizing (see e.g., FIG. 3, and related discussion); by exposing TCP network conditions to the TLS application within the user space, the TLS application can correctly size records for network congestion and/or wait for underlying TCP retransmissions (rather than timing out).

Similarly, consider the previous examples of multi-threading within the context of expected use devices (see e.g., FIG. 5, and related discussion); the primary user space application (e.g., video coding) and additional secondary interactive applications (e.g., remote control interface, headphones, and/or other interface devices) can internally negotiate their relative priority to the user's experience. The user space applications can appropriately adjust their priorities for the nexus (i.e., which networking threads are serviced first and/or should be deprioritized). Consequently, the user space applications can deprioritize non-essential network accesses, thereby preserving enough CPU cycles for video decode.

As a related benefit, since a software agent represents the application to the kernel; the agent can trust the kernel, but the kernel may or may not trust the agent. For example, a software agent can be used by the kernel to convey network congestion information in a trusted manner to the application; similarly, a software agent can be used by an application to request a higher network priority. Notably, since a software agent operates from user space, the agent's privilege is not promoted to kernel level permissions. In other words, the agent does not permit the user application to exceed its privileges (e.g., the agent cannot commandeer the network driver at the highest network priority or force a read/write to another application's memory space without the other kernel and/or other application's consent).

Networking extensions allow the user space application to execute networking communications functionality within the user space and interpose a network extension between the user space application and the kernel space. As a result, the number of cross domain accesses for complex layering of different protocol stacks can be greatly reduced. Limiting cross domain accesses prevents context switching and allows the user space to efficiently police its own priorities. For example, consider the previous example of a VPN session as was previously illustrated in FIG. 4. By keeping the TCP/IP, Internet Protocol Security (IPsec) and TLS operations within user space, the entire tunnel can be performed within the user space, and only cross the user/kernel domain once.

As used herein, the term "interposition" may refer without limitation to the insertion of an entity between two or more layers. For example, an agent is interposed between the application and the user space networking stack. Depending on the type of agent or network extension, the interposition can be explicit or implicit. Explicit interposition occurs where the application explicitly instances the agent or network extension. For example, the application may explicitly call a user space tunnel extension. In contrast, implicit interposition occurs where the application did not explicitly instance the agent or network extension. Common examples of implicit interposition occur where one user space application sniffs the traffic or filters the content of another user space application.

As used herein, an "instance" may refer without limitation to a single copy of a software program or other software object; "instancing" and "instantiations" refers to the creation of the instance. Multiple instances of a program can be created; e.g., copied into memory several times. Software object instances are instantiations of a class; for example, a first software agent and second software instance are each distinct instances of the software agent class.

Exemplary User Space Networking Stack

Figure 7:
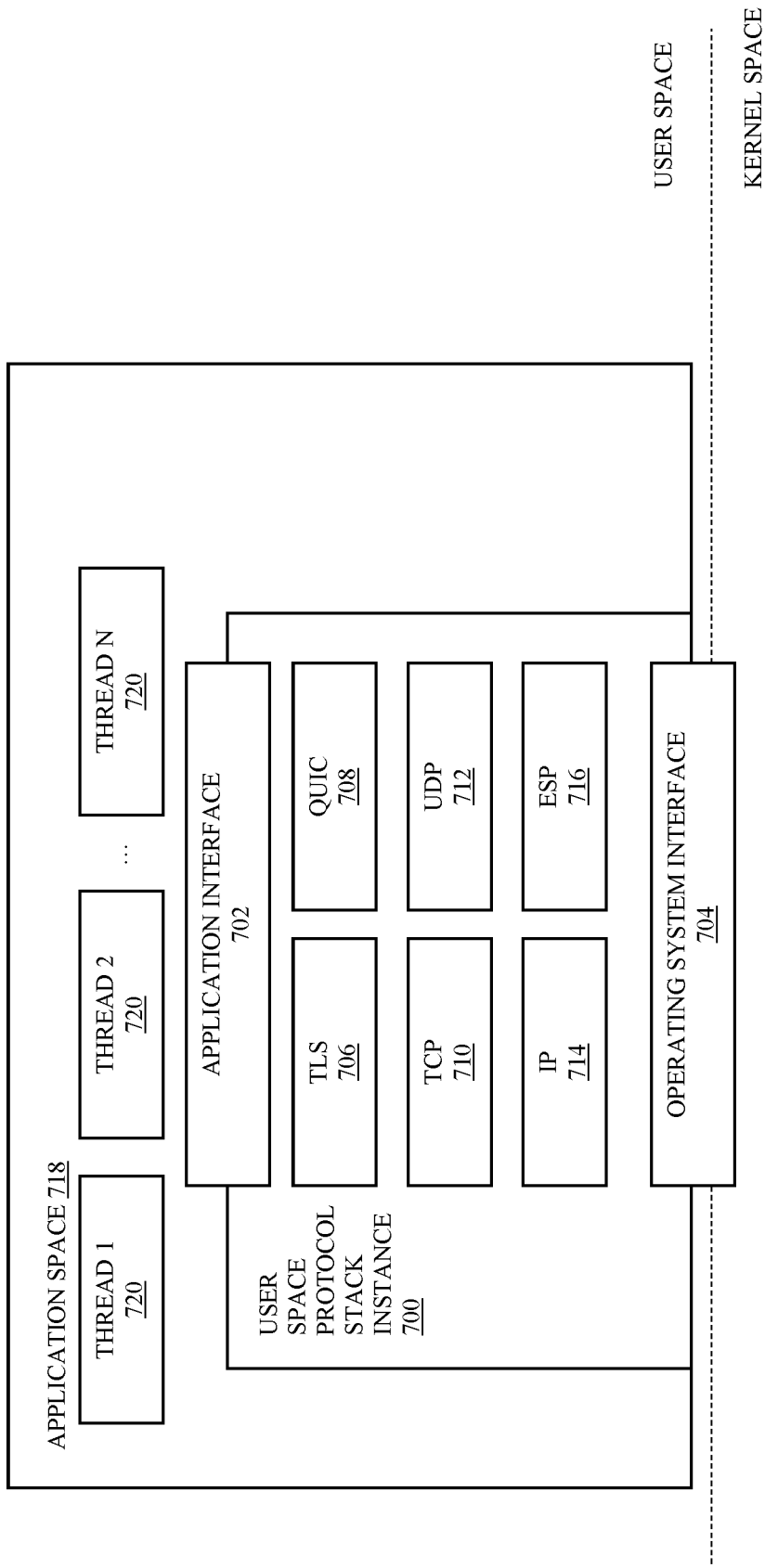
FIG. 7 is a logical block diagram of an exemplary user space networking stack, in accordance with the various aspects of the present disclosure.

Referring now to FIG. 7, one logical block diagram of an exemplary user space networking stack 700 is depicted. As shown, the user space networking stack 700 includes an application interface 702, and an operating system interface 704. Additionally, the user space networking stack includes one or more user space instances of TLS 706, QUIC 708, TCP 710, UDP 712, IP 714, and ESP 716. The disclosed instances are purely illustrative, artisans of ordinary skill in the related arts will readily appreciate that any other user space kernel extension and/or socket functionality may be made available within the user space networking stack 700.

In one exemplary embodiment, the user space networking stack 700 is instantiated within an application user space 718. More directly, the user space networking stack 700 is treated identically to any one of multiple threads 710 within the application user space 718. Each of the coexisting threads 720 has access to the various functions and libraries offered by the user space networking stack via a direct function call.

As a brief aside, each of the threads 720 reside within the same address space. By virtue of their shared addressability, each of the threads may grant or deny access to their portions of shared address space via existing user space memory management schemes and/or virtual machine type protections. Additionally, threads can freely transfer data structures from one to the other, without e.g., incurring cross domain penalties. For example, TCP data 710 can be freely passed to TLS 706 as a data structure within a user space function call.

As previously noted, the user space networking stack 700 may grant or deny access to other coexistent user space threads; e.g., a user space thread is restricted to the specific function calls and privileges made available via the application interface 702. Furthermore, the user space networking stack 700 is further restricted to interfacing the operating system via the specific kernel function calls and privileges made available via the operating system interface 704. In this manner, both the threads and the user space networking stack have access and visibility into the kernel space, without compromising the kernel's security and stability.

One significant benefit of the user space networking stack 700 is that networking function calls can be made without acquiring various locks that are present in the inkernel networking stack. As previously noted, the "locking" mechanism is used by the kernel to enforce access limits on multiple threads from multiple different user space applications; however in the user space, access to shared resources are handled within the context of only one user application space at a time, consequently access to shared resources are inherently handled by the single threading nature of user space execution. More directly, only one thread can access the user space networking stack 700 at a time; consequently, kernel locking is entirely obviated by the user space networking stack.

Another benefit of user space network stack operation is cross platform compatibility. For example, certain types of applications (e.g., iTunes®, Apple Music® developed by the Assignee hereof) are deployed over a variety of different operating systems. Similarly, some emerging transport protocols (e.g. QUIC) are ideally served by portable and common software between the client and server endpoints. Consistency in the user space software implementation allows for better and more consistent user experience, improves statistical data gathering and analysis, and provides a foundation for enhancing, experimenting and developing network technologies used across such services. In other words, a consistent user space networking stack can be deployed over any operating system platform without regard for the native operating system stack (e.g., which may vary widely).

Another important advantage of the exemplary user space networking stack is the flexibility to extend and improve the core protocol functionalities, and thus deliver specialized stacks based on the application's requirements. For example, a video conferencing application (e.g., FaceTime® developed by the Assignee hereof) may benefit from a networking stack catered to optimize performance for real-time voice and video-streaming traffics (e.g., by allocating more CPU cycles for video rendering, or conversely deprioritizing unimportant ancillary tasks). In one such variant, a specialized stack can be deployed entirely within the user space application, without specialized kernel extensions or changes to the kernel. In this manner, the specialized user space networking stack can be isolated from networking stacks. This is important both from a reliability standpoint (e.g., updated software doesn't affect other software), as well as to minimize debugging and reduce development and test cycle times.

Furthermore, having the network transport layer (e.g. TCP, QUIC) reside in user space can open up many possibilities for improving performance. For example, as previously alluded to, applications (such as TLS) can be modified depending on the underlying network connections. User space applications can be collapsed or tightly integrated into network transports. In some variants, data structure sizes can be adjusted based on immediate lower layer network condition information (e.g., to accommodate or compensate for poor network conditions). Similarly, overly conservative or under conservative transport mechanisms can be avoided (e.g., too much or not enough buffering previously present at the socket layer). Furthermore, unnecessary data copies and/or transforms can be eliminated and protocol signaling (congestion, error, etc.) can be delivered more efficiently.

In yet another embodiment, the exemplary user space networking stack further provides a framework for both networking clients and networking providers. In one such variant, the networking client framework allows the client to interoperate with any network provider (including the legacy BSD stack). In one such variant, the network provider framework provides consistent methods of discovery, connection, and data transfer to networking clients. By providing consistent frameworks for clients and providers which operate seamlessly over a range of different technologies (such as a VPN, Bluetooth, Wi-Fi, cellular, etc.), the client software can be greatly simplified while retaining compatibility with many different technologies.

Asymmetric Memory Usage and Security Considerations for Device Drivers

Certain aspects of device driver operation require special access; for example, device drivers often require direct read/write access to physical memory locations (as opposed to virtualized memory allocations). As but another example, device drivers may have latency and/or throughput requirements that are more stringent than user space processes. Historically, third party device drivers have been executed from kernel space consistent with heightened privileges and/or device access; however, this arrangement is dangerous.

As a brief aside, in order to facilitate integration, third party vendors often provide ready-to-use device drivers and/or firmware. Unfortunately, in some situations, vendors develop and release features without full verification. In other situations, the components and/or driver software may be used in a manner inconsistent with the vendor's intended use case and/or design assumptions. Malicious actors have learned to exploit and/or leverage third party device driver vulnerabilities in consumer electronics. Specifically, the aforementioned instability and/or vulnerability of third party drivers can be easily attacked; once compromised, the malicious actor has full access to the kernel via the third party driver's kernel access.

Figure 8:
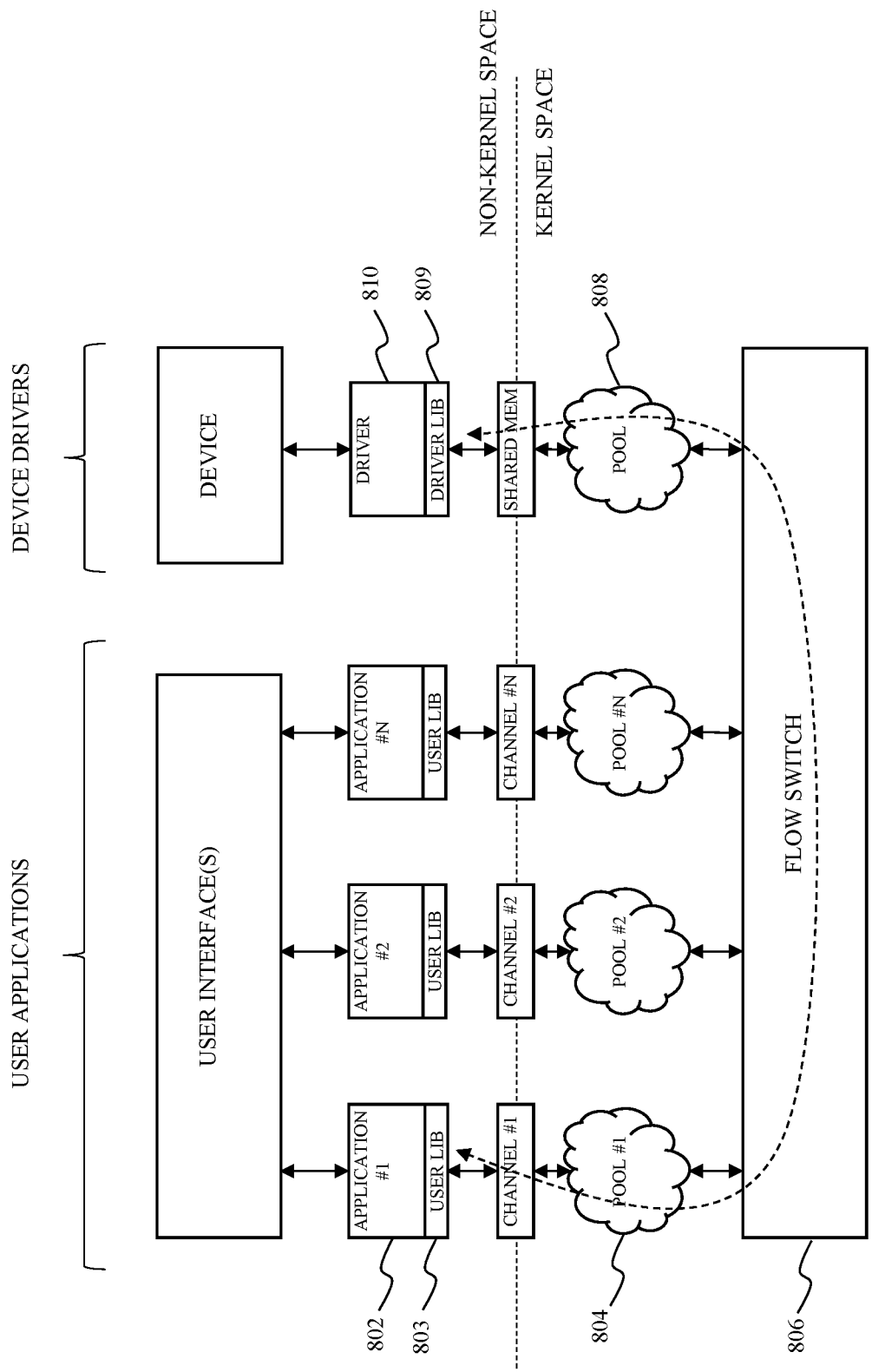
FIG. 8 is a logical block diagram of one exemplary networking architecture that isolates non-kernel functions from kernel space, useful for explaining various aspects of the present disclosure.

Kernel vulnerability can be reduced by ensuring that all non-kernel processes are isolated from kernel space. FIG. 8 is a logical block diagram of one exemplary networking architecture that isolates non-kernel functions (e.g., user applications and device drivers) from kernel space. During operation, one or more user space applications 802 generate and consume packet data from the user packet pool 804. The flow switch 806 routes packet data to/from the user packet pool 804 and driver packet pool 808. The device driver 810 is a non-kernel process that transacts packet data to/from the driver packet pool 808.

The exemplary networking architecture of FIG. 8 handles device drivers as non-kernel space processes. In other words, non-kernel space is allocated for application software and device drivers whereas kernel space is strictly reserved for running privileged operating system (O/S) processes. Just like user space processes, each device driver process runs in a specific memory allocation (a "sandbox") and cannot access the memory of other processes unless explicitly allowed. Notably, device drivers do not have kernel privileges; thus, compromised device drivers cannot affect kernel space.

As illustrated in FIG. 8, user space processes 802 may call a user space library 803 to interface to the flow switch 806 via a channel; in analogous manner, device driver processes 810 may call a driver library 809 to interface via a shared memory interface. Device drivers have different requirements from user space processes, and the differences in libraries 803, 809 reflects this functional difference. For example, while the exemplary user space networking architecture takes advantage of human perception for user space processing (e.g., human perception is much more forgiving than hardware operation), lenient timing generally cannot be afforded to hardware/firmware operation. In other words, even though device drivers should not be treated as kernel space processes for security reasons, they also should not be treated as user space processes for real-time reasons.

Figure 9:
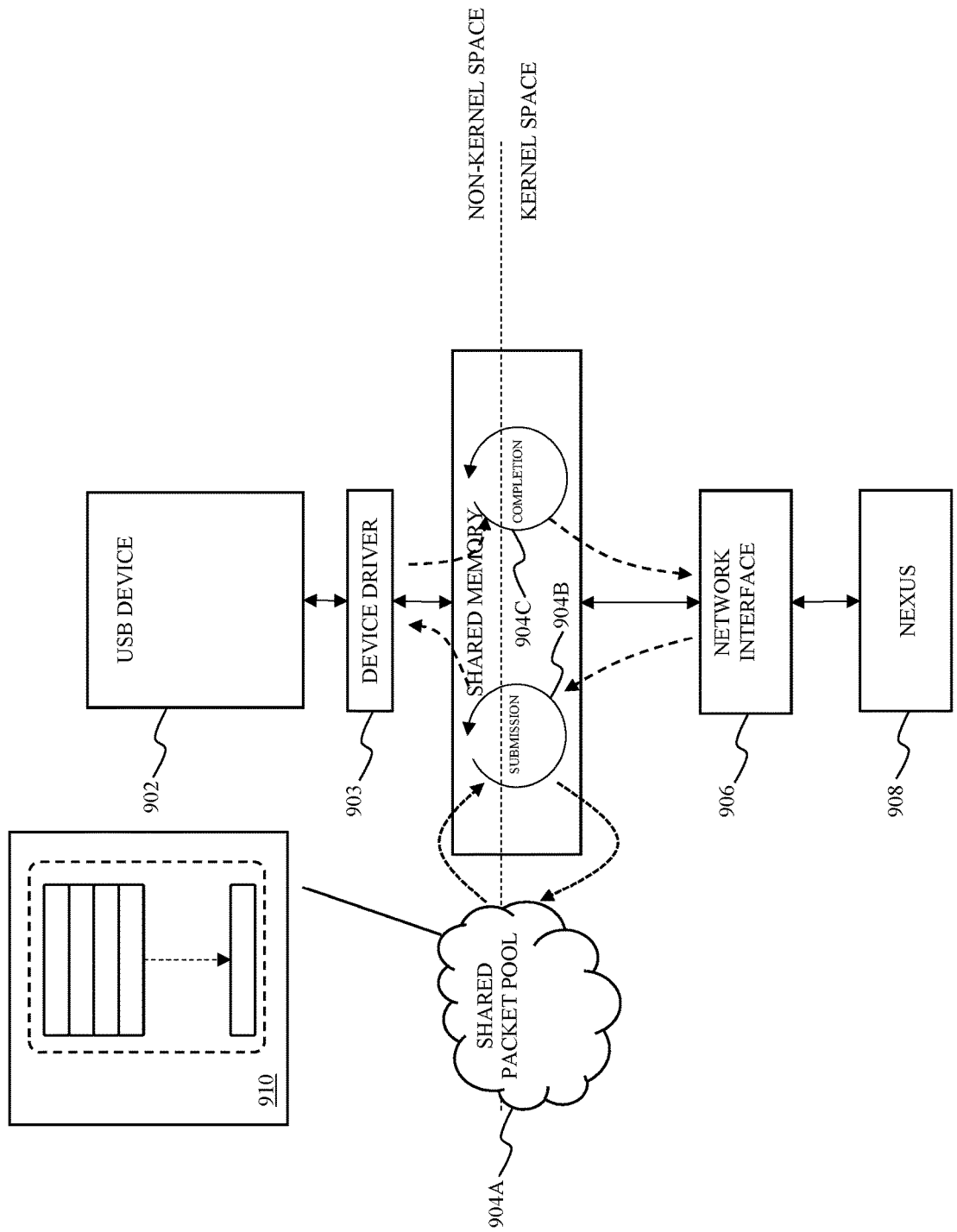
FIG. 9 is a logical block diagram of one shared memory interface for a non-kernel space driver, useful for explaining various aspects of the present disclosure.

FIG. 9 is a logical block diagram of one shared memory interface for a non-kernel space driver. As shown therein, a third party device 902 is accessible via a third party driver 903. The third party driver 903 calls a driver library to instantiate a shared memory interface 904A, 904B, 904C. The shared memory interface 904A, 904B, 904C can be read/written to by the nexus 908 via the network interface 906 operating from kernel space.

In one embodiment, the driver library application programming interface (API) is parameterized so as to support a broad spectrum of technologies. For example, the device driver library exposes shared memory space, for example, a packet pool 904A, a submission queue 904B, and a completion queue 904C. The memory spaces are allocated from a shared memory space based on the instantiating driver's requirements. More generally, artisans of ordinary skill in the related arts will readily appreciate that most device drivers are heavily optimized for their technology specific operation. Each technology may require different timing, buffering, and/or operation from other technologies. As a practical matter, these differences may be reflected in ring segment sizes, the number of memory segments per ring, etc. For example, larger memory rings may enable higher throughput at higher latency, while smaller memory rings may provide lower throughput at lower latency, etc.

During data transfer operations, the network interface writes data packets into a shared packet pool 904A. Pointers and/or indexes (or other referential data structures) to the packets are queued into the submission queue 904B. The device driver 903 de-references the pointers from the submission queue 904B and reads the data packets from the shared pool 904A. The data packets are delivered to the device 902. Subsequently thereafter, the driver 903 writes completion status into the completion ring 904C. The completed packets are returned to the network interface 906.

The foregoing example is presented in the context of the flow switch 908 providing packets to the device 902 (uplink), however the reverse direction (downlink) uses an analogous delivery mechanism. Specifically, the network interface allocates data packets for a read into a shared packet pool 904A. The driver 903 de-references the pointers from the submission queue 904B and writes into the allocated data packets. Subsequently thereafter, the driver 903 writes completion status into the completion ring 904C. The completed packets are returned to the network interface 906 for reading.

A graphical representation of the shared packet pool 904A is illustrated. Notably, the exemplary kernel space objects are sized to 2 KB which corresponds to the maximum transmission unit size for the de facto standard Ethernet packet (1500 bytes) and its associated metadata. Under the memory allocation scheme of FIG. 9, the kernel can directly address each packet based on its corresponding object. In other words, the exemplary object size 2 KB is selected to optimize kernel access on a per-packet basis. Notably, the exemplary kernel space object may be configured to support larger or smaller objects; the illustrated implementation merely being the most common for most Internet applications (circa 2020).

Figure 10A:
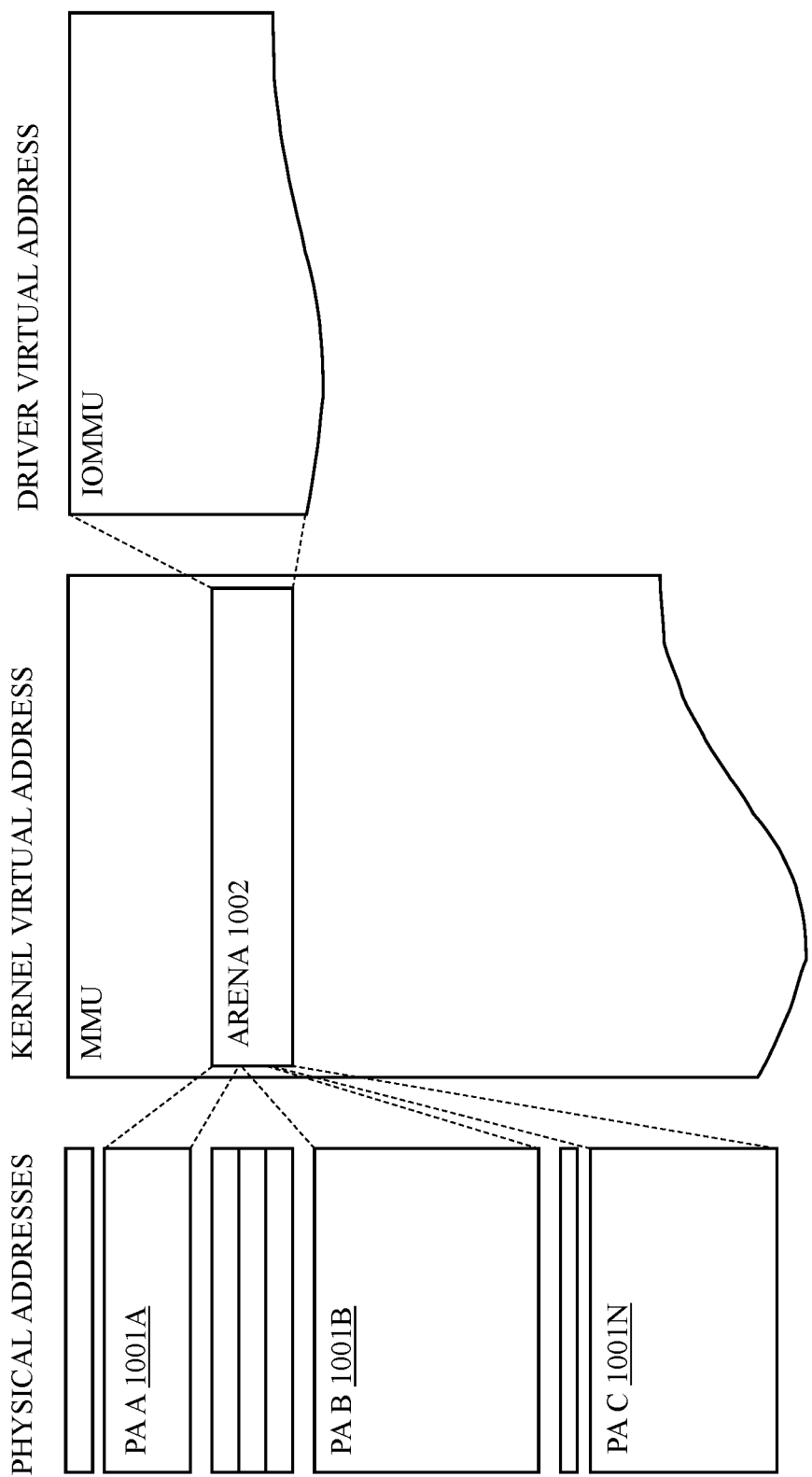
FIGS. 10A and 10B are graphical representations of physical and virtual memory mappings, useful for explaining various aspects of the present disclosure.

As a brief aside, executing device drivers in non-kernel space is both more secure and may provide opportunities for more efficient resource utilization. However, non-kernel space memory allocations are "virtualized" from physical memory. FIG. 10A illustrates a memory mapping of physical memory addresses to virtualized memory maps, useful to illustrate various aspects of the present disclosure. As shown therein, the kernel's memory map is composed of many smaller sections of physical addresses 1001A, 1001B . . . 1001N; these physical addresses are virtualized into the kernel's memory map by a memory management unit (MMU). A portion of the virtual memory map is allocated to the driver in the form of an arena 1002.

Figure 10B:
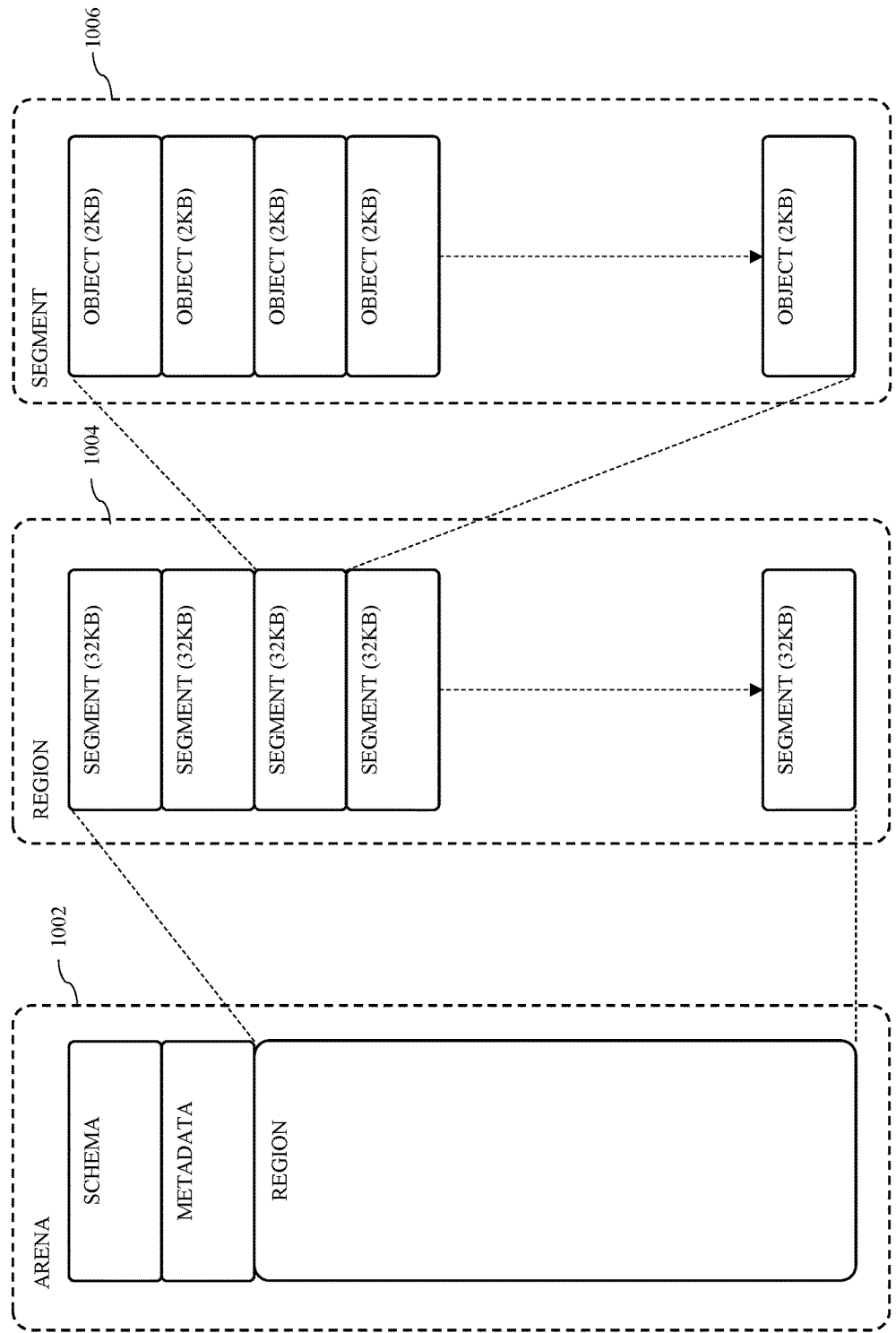

FIG. 10B is a logical block diagram of an exemplary virtual memory allocation for a device driver running in non-kernel space, useful to illustrate various aspects of the present disclosure. As shown therein, a driver is allocated an arena 1002 that may contain e.g., a schema, metadata, region, etc. The schema is a data structure that is used by the kernel to identify the overall organization of the arena. The schema may include information that identifies e.g., the type of arena, the organization of data structures in the arena, and/or the status of the arena; the metadata may store information associated with the arena. The region 1004 is further subdivided into a number of segments 1006; each segment 1006 stores a number of kernel space objects.

During operation, the driver independently configures and manages its arena 1002 via an Input/Output Memory Management Unit (IOMMU).

Virtualization allows the kernel space to manage its physical memory resources, while providing transparent and seamless memory mappings for non-kernel applications. In other words, the kernel can allocate, de-allocate, and/or suspend memory allocations as needed; the non-kernel space application (user application, device driver, etc.) is unaware of the physical memory it is residing in. In many cases, virtualization is necessary to maximize overall device performance, as well as to prevent unauthorized access (security and robust software design). Unfortunately, device drivers often are tightly coupled to physical memory resource usage; thus, device drivers may need e.g., physical memory access, contiguous memory allocations, and/or other memory access privileges, etc.

While non-kernel space networking stacks already provide substantial improvements over kernel space networking stacks for generic networking, various embodiments of the present disclosure may further improve network performance for certain types of device drivers and/or applications. As but one such example, some networking technologies are asymmetric in the amount of data that is transmitted and received. Asymmetry may result in substantial differences in transmit and receive complexity, as well as different packet processing optimizations. For example, certain cellular technologies (e.g., 4G, 5G) rely on OFDMA (Orthogonal Frequency Division Multiple Access) to maximize downlink bandwidth, but SC-FDMA (Single Carrier Frequency Division Multiple Access) to reduce uplink interference between user equipment.

As a brief aside, polylithic networking for consumer electronics tends to be asymmetrically distributed across multiple stacks. For example, a user consuming video may be downloading large amounts of data for just a single network stack. However, multiple other background services may be providing periodic upstream traffic (e.g., location updates, keep alive signaling, text media, etc.) Ideally, in such scenarios, most of the received traffic can be batched and routed to its corresponding endpoint application, whereas upstream traffic may be generated by multiple different stacks and sent a packet at a time. In other words, the large volume of downlink packet processing may benefit from packet aggregation (batch processing), whereas uplink packet processing may prefer to process packets on an individual basis.

Additionally, while non-kernel device driver operation is more stable than kernel space device driver operation, compromised device drivers may still consume system resources in an undesirable manner. For example, a compromised third party device driver could overwrite receive or transmit data; this can result in excessive retransmissions, wasted network bandwidth, wasted device resources (processing, memory, bandwidth), etc.

Still further, shared packet pool configurations have a finite number of resources (e.g., packet objects). In the aforementioned implementation, packet objects from the shared set of resources are allocated based on the submission queue, and freed based on the completion queue. For highly asymmetric traffic, reception can starve transmission and vice versa; e.g., transmit data cannot be packetized when all the packet objects are allocated to received traffic (transmission should be delayed until received packets are completed).

Split Receive Transmit Memory Allocations

Figure 11:
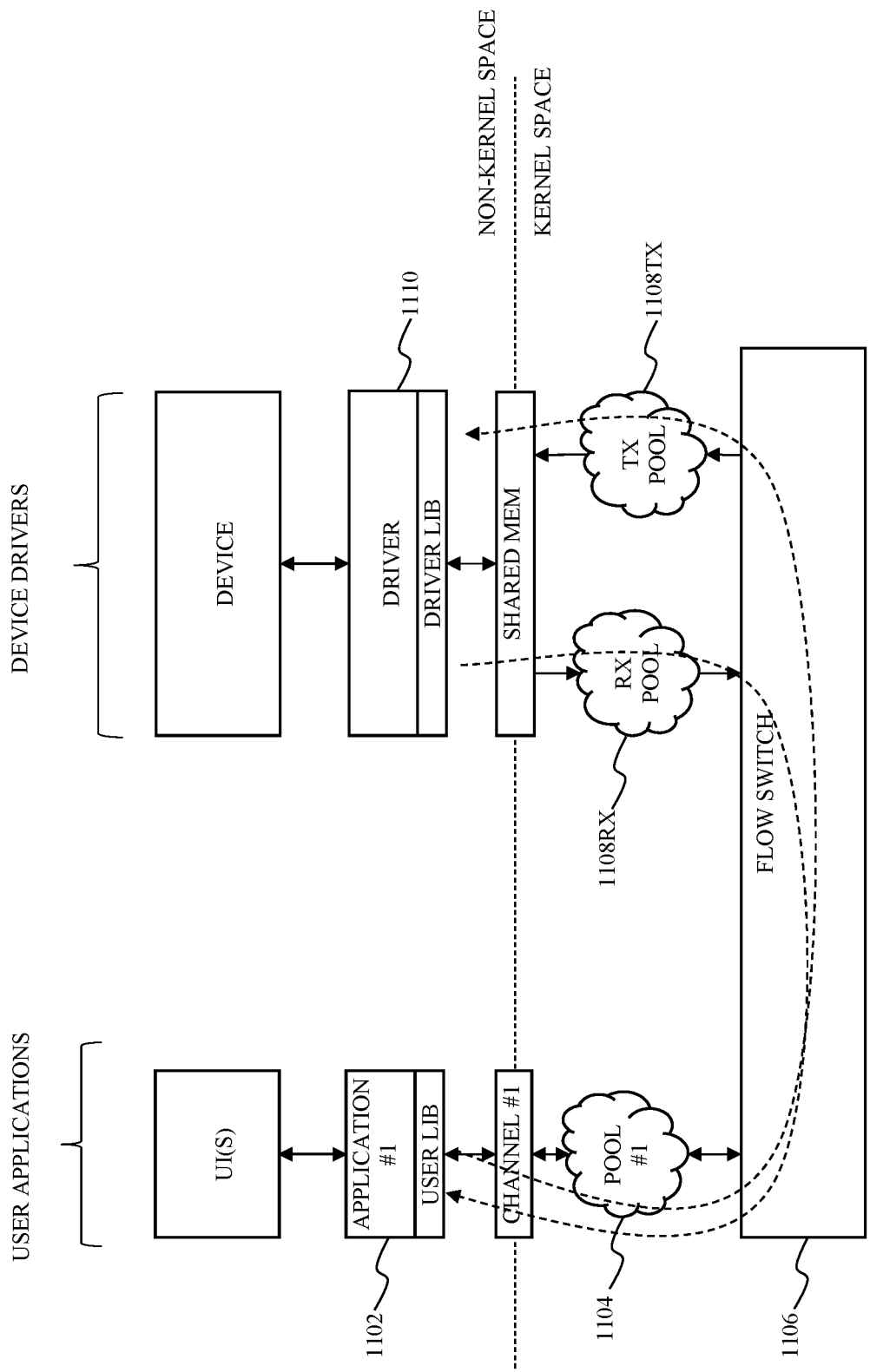
FIG. 11 is a logical block diagram of one exemplary networking architecture that splits receive and transmit operation, in accordance with various aspects of the present disclosure.

FIG. 11 is a logical block diagram of one exemplary networking architecture that splits receive and transmit operation. During operation, one or more user space applications 1102 generate and consume packet data from the user packet pool 1104. The flow switch 1106 routes packet data to/from the user packet pool 1104 and driver packet pool 1108. The device driver 1110 is a non-kernel process that writes packets to the receive packet pool 1108RX and reads packets from the transmit packet pool 1108TX.

Unlike the aforementioned shared memory interface for non-kernel space drivers (described in FIG. 9, supra) which shared a common configuration and parameters for both receive and transmit packet pools, the split memory structure allows for device drivers to independently configure receive and transmit packet pools. In one exemplary embodiment, different aspects of device driver operation are tightly coupled to physical hardware; thus, differences in hardware implementation are configured for different processing, memory, power management, etc.

Figure 12:
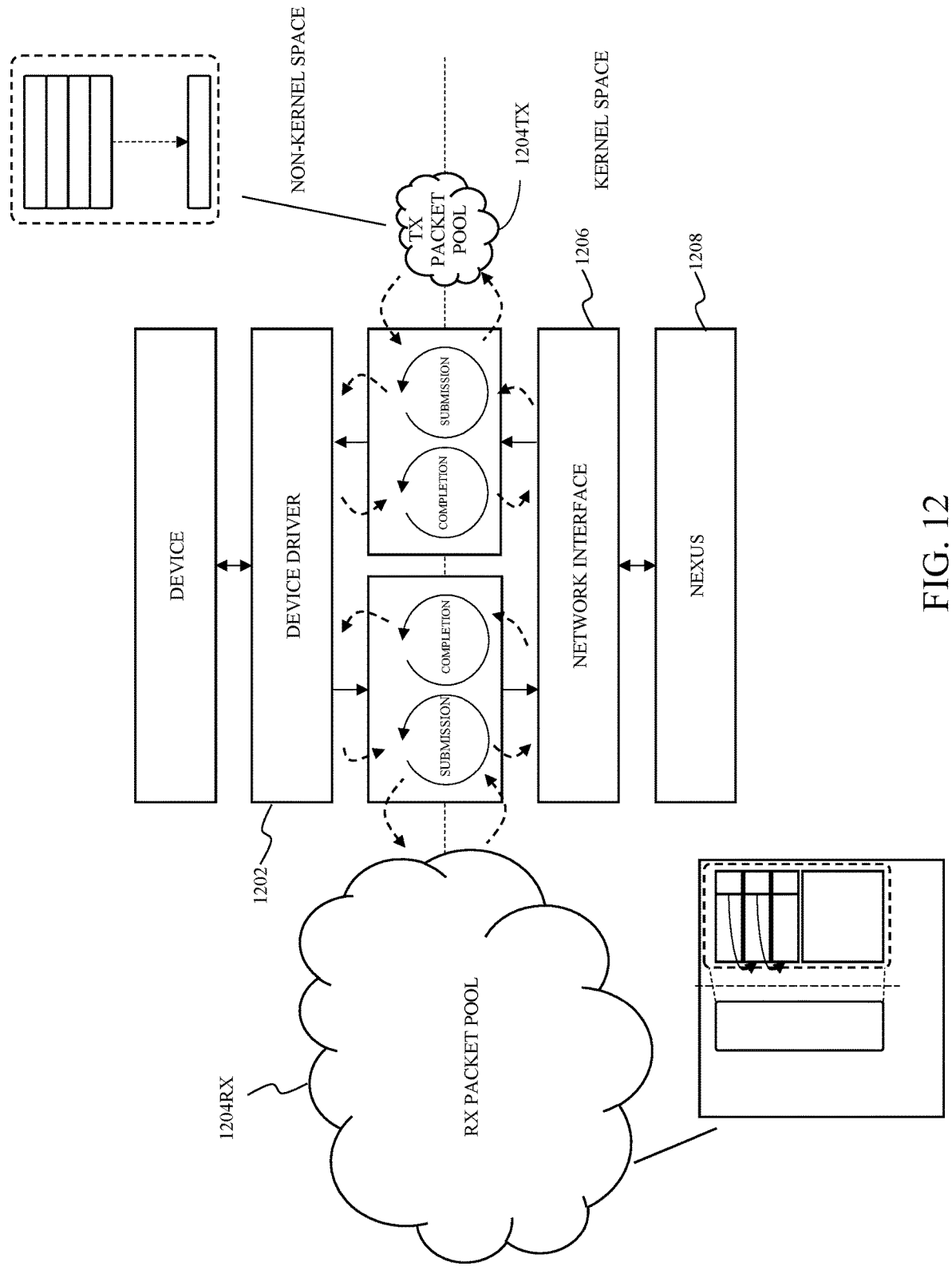
FIG. 12 is an illustrative asymmetric packet pool configuration, in accordance with various aspects of the present disclosure.

Referring now to FIG. 12, an illustrative asymmetric packet pool configuration is shown. In the exemplary embodiment, the device driver 1202 configures a receive packet pool 1204RX to support large scale packet aggregation based on buffer cloning. As described in greater detail hereinafter, buffer cloning enables the kernel to route multiple packets together within a single large kernel space object (e.g., 32 KB) thereby greatly reducing per-packet processing costs. In contrast, the transmit packet pool 1204TX is configured to route packets one at a time to support multiple concurrent background applications. In such situations, relatively small kernel space objects (2 KB) provide sufficient granularity for kernel space operations.

Figure 13:
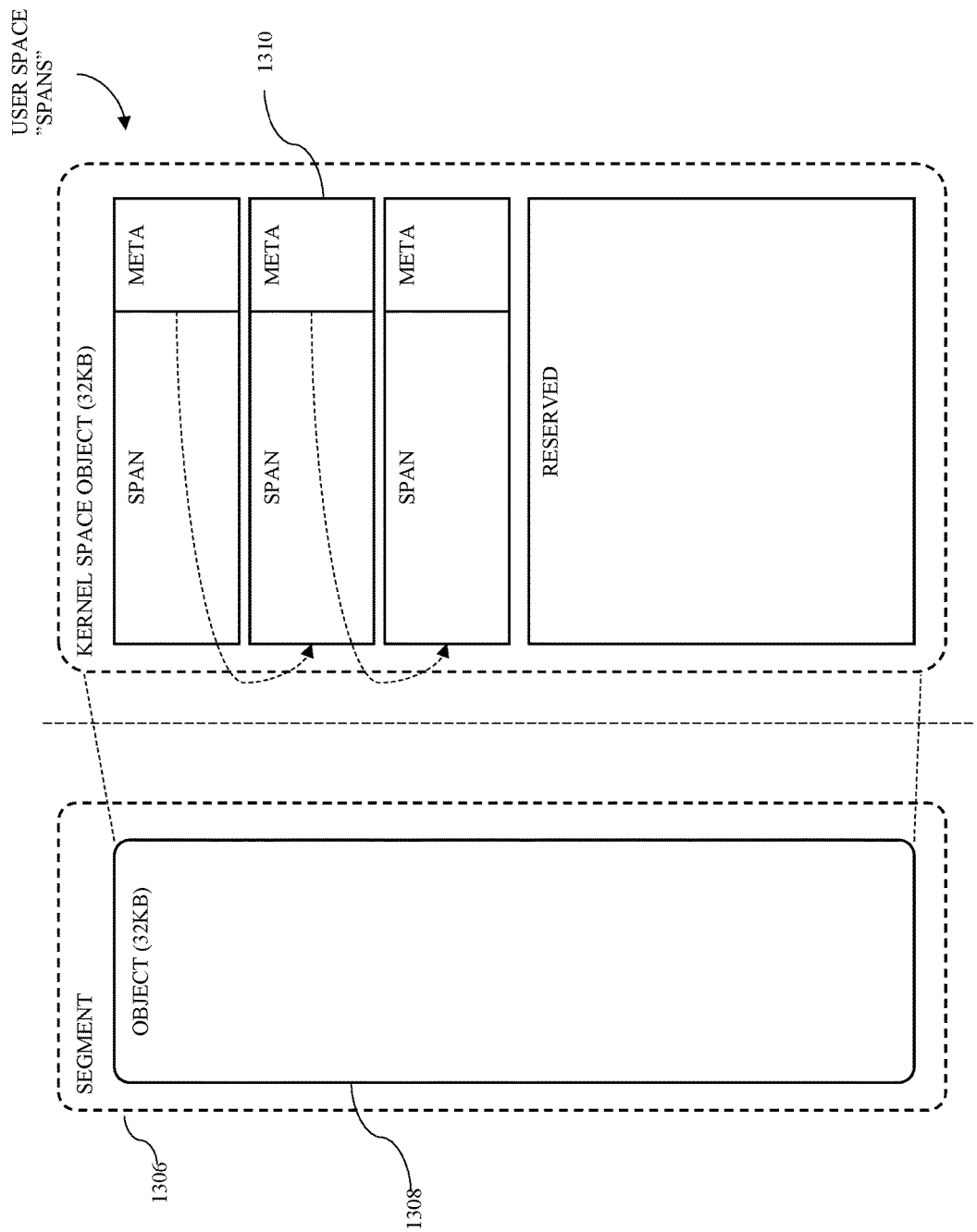
FIG. 13 is a logical block diagram of an exemplary segment that stores a number of "cloned" objects, in accordance with various aspects of the present disclosure.

As a brief aside, FIG. 13 is a logical block diagram of an exemplary segment that stores a number of "cloned" objects, in accordance with various aspects of the present disclosure. Unlike non-cloned operation, the allocated segments 1306 are treated as discrete objects 1308 by the kernel. The device driver (or other endpoint application) can freely subdivide the object 1308 in accordance with its own requirements. In other words, the kernel space can natively route and/or manipulate the kernel space object without regard to the underlying user space spans. The exemplary nexus described supra may route the kernel space object based on only the first packet for each chain; the nexus need not route each packet individually (thus avoiding per-packet routing costs).

As used herein, the terms "clone", "cloned", "cloning" (and related linguistic variants) refer to a discrete memory allocation for processing in a first domain (e.g., kernel space) that contains multiple similar data structures that are configured for the same control and/or data path endpoint processing in a second domain (e.g., non-kernel). For example, a driver application may request (or be granted) one or more discrete 32 KB objects that store up to sixteen 2 KB packets; the kernel can process the 32 KB object in aggregate using the cloned packet metadata. However, once delivered to an endpoint (e.g., an endpoint user application or the device driver) the object can be parsed for its constituent packets. Cloned packets can be directly manipulated by the endpoint/driver (independent of kernel space memory management) and routed/transported in aggregate by the intermediary kernel space entities. The packet cloning optimizations described herein provide multiple benefits over non-cloned operation. For example, non-kernel space networking architectures can greatly improve performance by batching similar traffic together thereby reducing per-packet costs (e.g., ACK/NACK, retransmission, etc.) and/or per-byte costs (copy, fragmentation, defragmentation, checksum, etc.)

In one embodiment, the endpoint specific subdivisions are stored in metadata 1310 that identifies the "span" of the subdivision. For example, in the illustrated implementation, a device driver that is allocated a 32 KB object 1308 may subdivide the buffer into three spans of 9 KB (also "Jumbo" ethernet frames) and an unused space (as shown) for a first usage, but re-divide the 32 KB object 1308 into sixteen spans of 2 KB for default use. In other words, the device driver may freely modify spans independent of kernel space memory management.

Notably, since spans may be used for specific (non-generic) data transfers between the endpoint and/or the device driver, spans may widely vary based on user space negotiated parameters. In other words, the device driver can adjust its span selection according to user space networking stack considerations and/or other cross-layer considerations. For example, spans may be symmetric/uniform or asymmetric (e.g., vary in size, access (R/W), etc.) Spans may be statically set, dynamically adjusted, or some variant thereof. As but one such example, a device driver may allocate a fixed number of spans based on its own considerations; alternatively, the device driver may flexibly allocate spans based on an as-needed-basis, based on its served endpoint requirements. Still other variants may consider any number of driver, client, kernel, and/or network considerations.

In some variants, the kernel may additionally provide supplemental information and/or kernel support via degenerate or redundant data structures. In one such implementation, the degenerate data structure may be a "packet" pointer that points to the object (instead of its packet). As but one such example, degenerate pointers may be used by the kernel space to reference the same object for multiple data packets. The kernel space entity can use the degenerate pointers to e.g., provide kernel space updates that correspond to the endpoint packets without de-referencing or otherwise manipulating the packets of the object. Kernel space updates may be stored in metadata for the object and handled by the endpoint non-kernel space application when necessary (thereby avoiding per-packet kernel processing). While the foregoing example is presented in the context of a degenerate pointer (a packet pointer that does not point to its packet), any data structure that lacks a key characteristic of its type may be substituted with equal success by artisans of ordinary skill in the related arts, given the contents of the present disclosure. Examples of such data structures include referential data structures that do not reference a data structure, value data structures that are nulled, etc.

Referring back to FIG. 12, during data reception the device driver 1202 writes its received data packets into the spans of a cloned object; degenerate packet pointers are tracked in the submission and completion queues. When the receive data is ready for transfer, the network interface 1206 only needs to de-reference a single degenerate pointer from the submission queue and read the cloned object (which comprises many packets) from the receive pool 1204RX (thereby avoiding per-packet costs for reading each packet/span). The cloned object is delivered to the nexus 1208 for delivery to its endpoint application on a per-flow basis (not a per-packet basis). Subsequently thereafter, the network interface 1206 writes completion status into the completion ring. The cloned object is returned to the device driver 1202.

Similarly, in the transmit direction, the network interface 1206 writes packets into packet objects of the transmit packet pool 1204TX. Notably, each packet is its own kernel space object (e.g., packets may originate from different stacks of the polylithic networking architecture). At transmission events, the device driver reads packet objects from the transmit packet pool 1204TX based on the submission queue. Successfully transmitted packets are completed and returned to the transmit packet pool 1204TX.

More generally, splitting the receive and transmit packet pools in accordance with the various principles described herein may be particularly useful where kernel treatment of the packets is different. For example, kernel treatment of the receive packet pool can be based on buffer cloning and substantially larger kernel space objects (32 KB) that enable packet aggregation and routing on a per-flow basis whereas the transmit packet pool does not support cloning, uses a smaller kernel object granularity (2 KB), and routes packets on a per-packet basis. Additionally, splitting packet pool allocations between transmit and receive ensures that receive data does not starve transmit data or vice versa. Each data pipe has its own set of resources which are separately allocated and/or freed.

While the foregoing is presented in the context of transmit and receive operation, artisans of ordinary skill in the related arts will readily appreciate that any distinct hardware functionality may be implemented with distinct packet pools. Such functionality may differentiate resources based on different priorities, protocols, capabilities, and/or optimizations. For example, bulk cellular data may be allocated a set of pools (transmit and/or receive) and messaging service (e.g., SMS) data may be allocated a separate set of pools. Similarly, TCP and UDP traffic may be transacted across different pools. Other examples capabilities and/or optimizations may include e.g., packet aggregation, just in time transformation, and or other processing optimizations.

As a related benefit, certain variants may monitor device driver operation to ensure that the driver complies with its intended behavior. Notably, unlike exemplary systems that implement drivers as kernel space entities (which bypasses memory management and usage restrictions checks), the exemplary non-kernel space drivers described herein can be monitored with user space/non-kernel space memory usage mechanisms. For example, a receive packet pool should only be written to by the device driver and read from by the network interface; unsanctioned transfers (e.g., a device driver that reads from the receive packet pool, etc.) may be flagged and/or disabled using the memory management unit (MMU). Preventing unsanctioned memory accesses greatly improves overall system security and stability.

Split packet pool operation provides a plethora of advantages that improve the functioning of a computer process. Notably, the exemplary split packet pool scheme described herein provides unconventional technical solutions for configuring memory allocations based on differences in receive and transmit hardware implementations. Separating transmit and receive operation may enable substantial improvements in device performance that were not heretofore possible within the monolithic networking stack and global resource processing paradigm (i.e., where all resources are uniform). In one specific example, the exemplary split packet pool scheme described herein enables different memory treatments for asymmetric networking technologies (e.g., OFDMA downlink, SC-FDMA uplink). In another such example, the exemplary split packet pool scheme described herein may provide for more robust and secure integration of third party components. More generally, the various principles described herein address specific privilege, prioritization, and/or utilization issues that are specific to polylithic networking architectures; these are unique and distinct from well-understood, routine, and/or conventional solutions implemented within monolithic networking architectures.

Figure 14A:
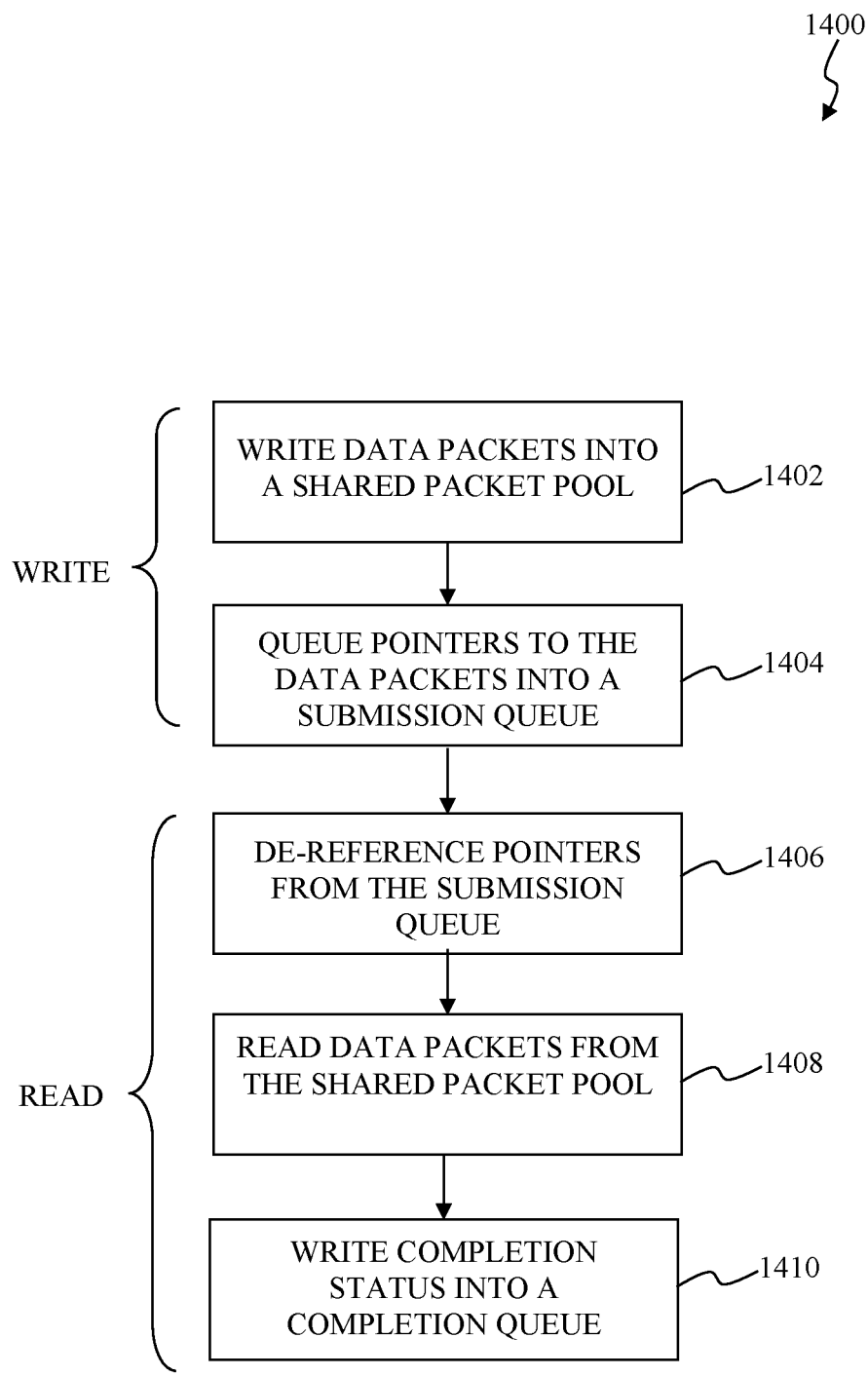
FIG. 14A illustrates a flowchart for an uplink data flow according to some exemplary embodiments of the present disclosure.

FIG. 14A illustrates a flowchart for an uplink data flow according to some exemplary embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 1400 for providing packets in an uplink direction, for example, from a network interface in the kernel space to a third party device in the non-kernel space. The operational control flow 1400 can be executed by one or more networking architectures as described above.

At operation 1402, the operational control flow 1400 writes data packets into a shared packet pool. In some embodiments, a network interface, such as the flow switch 806 as described above in FIG. 8, the network interface 906 as described above in FIG. 9, the flow switch 1106 as described above in FIG. 11, and/or the network interface 1206 as described above in FIG. 12 to provide some examples, in the kernel space can write the data packets into the shared packet pool. In some embodiments, the shared packet pool can include a split packet pool having a receive packet pool and a transmit packet pool. In these embodiments, the operational control flow 1400 writes the data packets into the transmit packet pool.

At operation 1404, the operational control flow 1400 queues pointers, or other referential data structures, to the data packets into a submission queue. In some embodiments, the network interface in the kernel space can queues the pointers, or the other referential data structures, to the data packets into a submission queue.

At operation 1406, the operational control flow 1400 de-references the pointers, or the other referential data structures, from the submission queue. In some embodiments, a device driver, such as the device driver 810 as described above in FIG. 8, the device driver 903 as described above in FIG. 9, the device driver 1110 as described above in FIG. 11, and/or the device driver 1202 as described above in FIG. 12 to provide some examples, in the non-kernel space can de-reference the pointers, or the other referential data structures, from the submission queue.

At operation 1408, the operational control flow 1400 reads data packets from the shared packet pool. In some embodiments, the device driver in the non-kernel space can read the data packets from the shared packet pool. In some embodiments, the operational control flow 1400 reads the data packets into the transmit packet pool from operation 1402.

At operation 1410, the operational control flow 1400 writes completion status into a completion queue. In some embodiments, the device driver in the non-kernel space can write the completion status into the completion queue. In some embodiments, the data packets can be returned to the network interface.

Figure 14B:
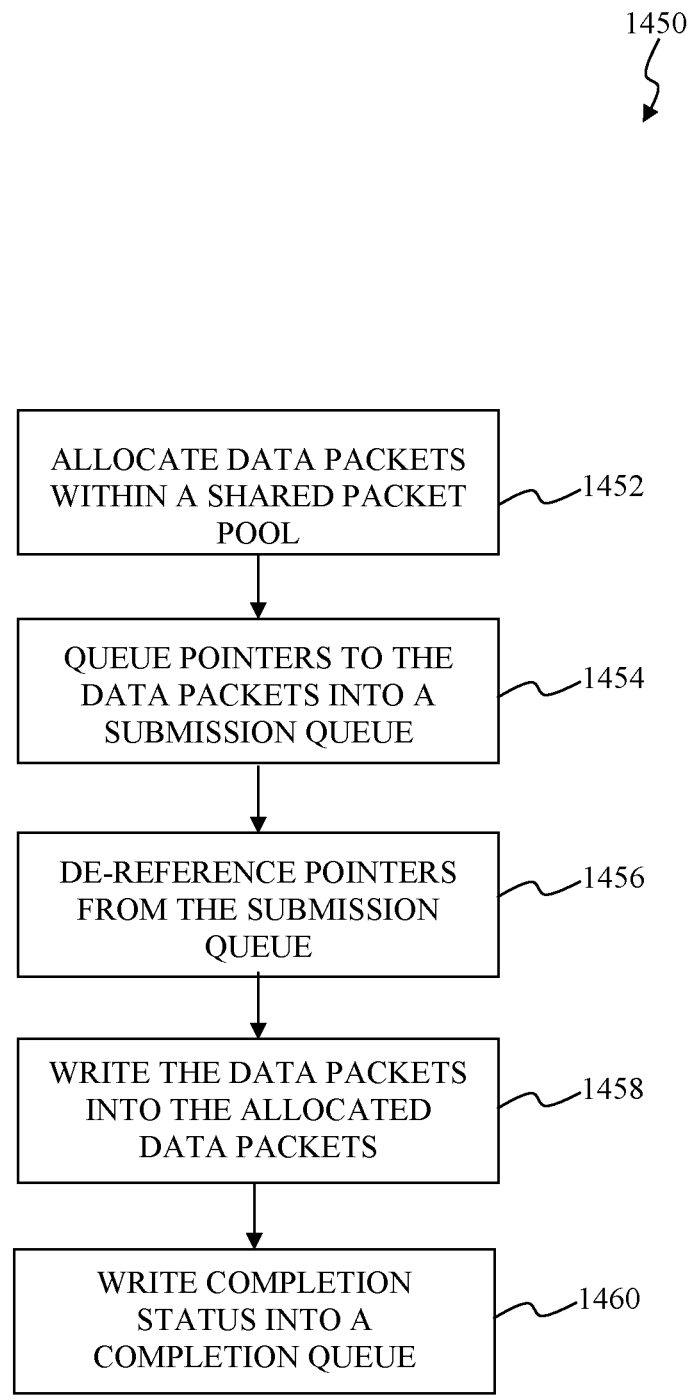
FIG. 14B illustrates a flowchart for a downlink data flow according to some exemplary embodiments of the present disclosure.

FIG. 14B illustrates a flowchart for a downlink data flow according to some exemplary embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 1450 for providing packets in a downlink direction, for example, from a third party device in the non-kernel space to a network interface in the kernel space. The operational control flow 1450 can be executed by one or more networking architectures as described above.

At operation 1452, the operational control flow 1450 allocates data packets within a shared packet pool. In some embodiments, a network interface, such as the flow switch 806 as described above in FIG. 8, the network interface 906 as described above in FIG. 9, the flow switch 1106 as described above in FIG. 11, and/or the network interface 1206 as described above in FIG. 12 to provide some examples, in the kernel space can allocate data packets within a shared packet pool. In some embodiments, the shared packet pool can include a split packet pool having a receive packet pool and a transmit packet pool. In these embodiments, the operational control flow 1450 allocates data packets within the receive packet pool.

At operation 1454, the operational control flow 1450 queues pointers, or other referential data structures, to the data packets into a submission queue. In some embodiments, the network interface in the kernel space can queues the pointers, or the other referential data structures, to the data packets into a submission queue.

At operation 1456, the operational control flow 1450 de-references the pointers, or the other referential data structures, from the submission queue. In some embodiments, a device driver, such as the device driver 810 as described above in FIG. 8, the device driver 903 as described above in FIG. 9, the device driver 1110 as described above in FIG. 11, and/or the device driver 1202 as described above in FIG. 12 to provide some examples, in the non-kernel space can de-reference the pointers, or the other referential data structures, from the submission queue.

At operation 1458, the operational control flow 1450 writes the data packets into the allocated data packets. In some embodiments, the device driver in the non-kernel space can write the data packets from into the allocated data packets. In some embodiments, the operational control flow 1450 writes into the allocated data packets of the receive packet pool from operation 1452.

At operation 1460, the operational control flow 1450 writes completion status into a completion queue. In some embodiments, the device driver in the non-kernel space can write the completion status into the completion queue. In some embodiments, the data packets can be returned to the network interface.

CONCLUSION

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It will be recognized the specific embodiments can be described in terms of a sequence of steps or operations, these descriptions are only illustrative of the broader steps or operations described herein, and may be modified as required by the particular application. Certain steps or operations may be rendered unnecessary or optional under certain circumstances. Additionally, certain steps or operations may be added to the disclosed embodiments, or the order of performance of two or more steps permuted. All such variations are considered to be encompassed within the disclosure herein.

The breadth and scope of the disclosure should not be limited by any of the above-described exemplary embodiments, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A computer system, comprising:
   a shared memory having a submission queue and a completion queue;
   a shared packet pool;
   a network interface within a kernel space configured to:
      write a data packet into the shared packet pool, and
      queue a pointer into the submission queue that indicates a location of the data packet in the shared packet pool; and a device driver within a non-kernel space configured to:
de-reference the pointer in the submission queue to read the data packet from the shared packet pool, and
write a completion status into the completion queue in response to reading the data packet from the shared packet pool.

2. The computer system of claim 1, wherein the device driver is further configured to return the data packet to the network interface in response to writing the completion status.

3. The computer system of claim 1, wherein the shared packet pool comprises a transmit packet pool and a receive packet pool, and
wherein the network interface is configured to write the data packet into the transmit packet pool, and
wherein the device driver is configured to de-reference the pointer to read the data packet from the transmit packet pool.

4. The computer system of claim 3, wherein the device driver is configured to de-reference the pointer to read the data packet from the transmit packet pool on a per-packet basis.

5. The computer system of claim 3, wherein the network interface is further configured to:
allocate storage within the receive packet pool to write a second data packet, and
queue a second pointer into the submission queue that indicates a location of the second data packet in the receive packet pool, and
wherein the device driver is further configured to:
de-reference the second pointer in the submission queue to write data into the second data packet in the receive packet pool, and
write a second completion status into the completion queue in response to writing the data.

6. The computer system of claim 5, wherein the device driver is configured to de-reference the second pointer to write the data into a plurality of spans of a cloned object.

7. The computer system of claim 6, wherein the second pointer is configured to indicate a location of the plurality of spans of the cloned object, and
wherein the network interface is further configured to de-reference the second pointer to read the plurality of spans of the cloned object from the receive packet pool.

8. A method of operating a computer system, the method comprising:
writing, by the computer system, a data packet from a kernel space into a shared packet pool;
queuing, by the computer system, a pointer indicating a location of the data packet in the shared packet pool;
de-referencing, by the computer system, the pointer to read the data packet from the shared packet pool into a non-kernel space; and
writing, by the computer system, a completion status in response to reading the data packet from the shared packet pool.

9. The method of claim 8, further comprising returning the data packet to the kernel space in response to writing the completion status.

10. The method of claim 8, wherein the writing the data packet comprises writing the data packet into a transmit packet pool of the shared packet pool, and
wherein the de-referencing comprises de-referencing the pointer to read the data packet from the transmit packet pool.

11. The method of claim 10, wherein the de-referencing comprises de-referencing the pointer to read the data packet from the transmit packet pool on a per-packet basis.

12. The method of claim 10, further comprising:
allocating, by the computer system, storage within a receive packet pool to write a second data packet;
queuing, by the computer system, a second pointer that indicates a location of the second data packet in the receive packet pool;
de-referencing, by the computer system, the second pointer to write data from the non-kernel space into the second data packet in the receive packet pool; and
writing, by the computer system, a second completion status in response to writing the data.

13. The method of claim 12, wherein the de-referencing the second pointer comprises de-referencing the second pointer to write the data into a plurality of spans of a cloned object.

14. The method of claim 13, wherein the second pointer is configured to indicate a location of the plurality of spans of the cloned object, and
wherein the method further comprises:
de-referencing, by the computer system, the second pointer to read the clone object from the receive packet pool into the kernel space.

15. A non-transitory storage medium configured to store one or more computer programs, the one or more computer programs, when executed by a computer system, configure the computer system to perform operations, the operations comprising:
writing a data packet from a kernel space into a shared packet pool;
queuing a pointer indicating a location of the data packet in the shared packet pool;
de-referencing the pointer to read the data packet from the shared packet pool into a non-kernel space; and
writing a completion status in response to reading the data packet from the shared packet pool.

16. The non-transitory storage medium of claim 15, wherein the operations further comprise returning the data packet to the kernel space in response to writing the completion status.

17. The non-transitory storage medium of claim 15, wherein the writing the data packet comprises writing the data packet into a transmit packet pool of the shared packet pool, and
wherein the de-referencing comprises de-referencing the pointer to read the data packet from the transmit packet pool.

18. The non-transitory storage medium of claim 17, wherein the de-referencing comprises de-referencing the pointer to read the data packet from the transmit packet pool on a per-packet basis.

19. The non-transitory storage medium of claim 17, wherein the operations further comprise:
allocating space for a second data packet to be written into a receive packet pool;
queuing a second pointer indicating a location of the second data packet in the receive packet pool;
de-referencing the second pointer to write data from the non-kernel space into the second data packet in the receive packet pool; and
writing a second completion status in response to writing the data.

20. The non-transitory storage medium of claim 19, wherein the de-referencing the second pointer comprises de-referencing the second pointer to write the data into a plurality of spans of a cloned object.

* * * * *